US008854687B2

(12) United States Patent
Sugiura et al.

(10) Patent No.: US 8,854,687 B2
(45) Date of Patent: Oct. 7, 2014

(54) IMAGE FORMING APPARATUS WITH SETTING SCREEN, SETTING METHOD, AND NON-TRANSITORY COMPUTER-READABLE RECORDING MEDIUM ENCODED WITH SETTING PROGRAM

(75) Inventors: Hiroshi Sugiura, Toyokawa (JP); Yoichi Kurumasa, Toyohashi (JP); Yusaku Tanaka, Toyokawa (JP); Yoshiyuki Tamai, Toyokawa (JP); Tomokazu Kato, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 276 days.

(21) Appl. No.: 13/455,953

(22) Filed: Apr. 25, 2012

(65) Prior Publication Data

US 2012/0274957 A1    Nov. 1, 2012

(30) Foreign Application Priority Data

Apr. 28, 2011  (JP) ................................ 2011-102528

(51) Int. Cl.
G06K 1/00      (2006.01)
H04N 1/00      (2006.01)
G06F 15/00     (2006.01)

(52) U.S. Cl.
CPC ............ *G06F 15/00* (2013.01); *H04N 1/00411* (2013.01); *H04N 1/00384* (2013.01)
USPC .......................................................... 358/1.9

(58) Field of Classification Search
None
See application file for complete search history.

(56) References Cited

U.S. PATENT DOCUMENTS

2003/0038821 A1*  2/2003  Kraft ............................. 345/629
2006/0028690 A1   2/2006  Kunori
2011/0276916 A1   11/2011 Kunori

FOREIGN PATENT DOCUMENTS

| JP | 8-221169 A     |   | 8/1996  |
|----|----------------|---|---------|
| JP | 2000-207108    | * | 7/2000  |
| JP | 2000-207108 A  |   | 7/2000  |
| JP | 2004-252727 A  |   | 9/2004  |
| JP | 2006-044167 A  |   | 2/2006  |
| JP | 2008-149676 A  |   | 7/2008  |
| JP | 2010-111044 A  |   | 5/2010  |
| JP | 2011-237983 A  |   | 11/2011 |

OTHER PUBLICATIONS

Japanese Office Action (Notice of Ground of Rejection) dated Jun. 11, 2013, issued by the Japanese Patent Office in corresponding Japanese Patent Application No. 102528/2011, and English language translation of Office Action. (7 pages).

* cited by examiner

*Primary Examiner* — Jeremiah Bryar
(74) *Attorney, Agent, or Firm* — Buchanan Ingersoll & Rooney PC

(57) ABSTRACT

An image forming apparatus includes a setting screen displaying portion to display a setting screen having a setting value setting area, an input screen displaying portion, responsive to designation of a position within a prescribed area determined by the setting area in the setting screen while the setting screen is being displayed, to display an input screen including input key images to be overlaid on the setting screen, a first setting value accepting portion to accept a value corresponding to the input key image designated by the user in the input screen, an operation accepting portion including hard keys, a second setting value accepting portion to accept a value corresponding to the hard key designated by the user, and a display terminating portion, responsive to acceptance of an operation of enabling the operation accepting portion while the input screen is being displayed, to terminate the display of the input screen.

16 Claims, 11 Drawing Sheets

F I G. 1
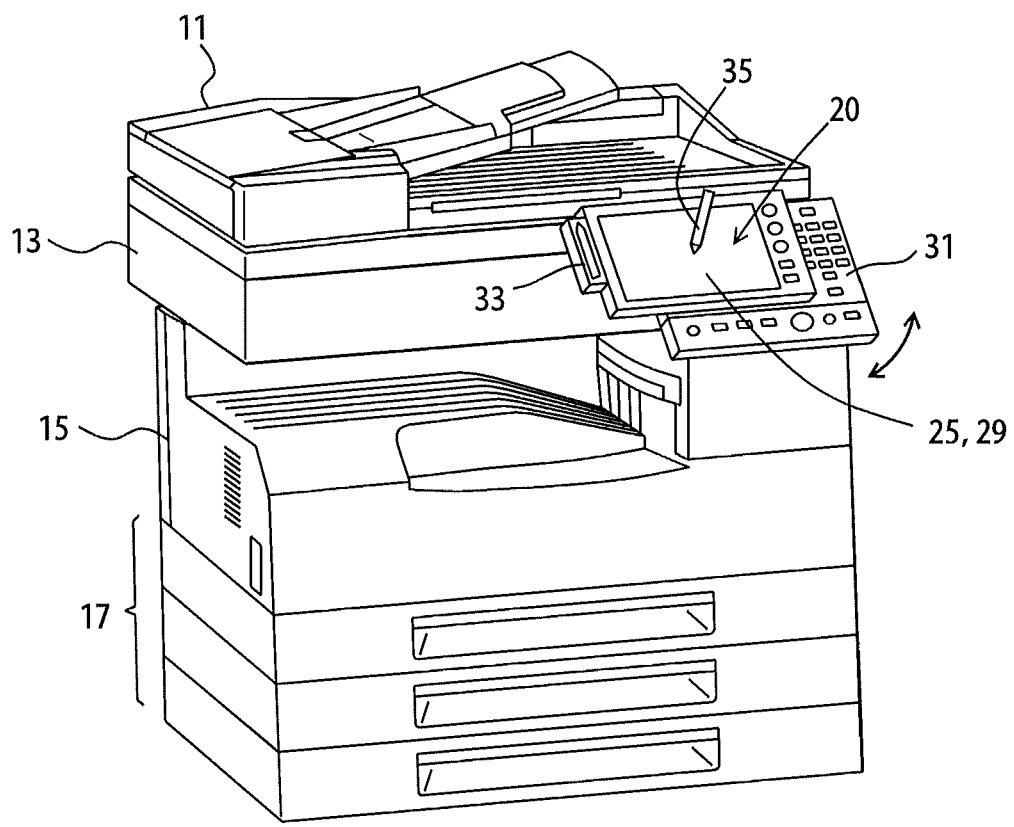

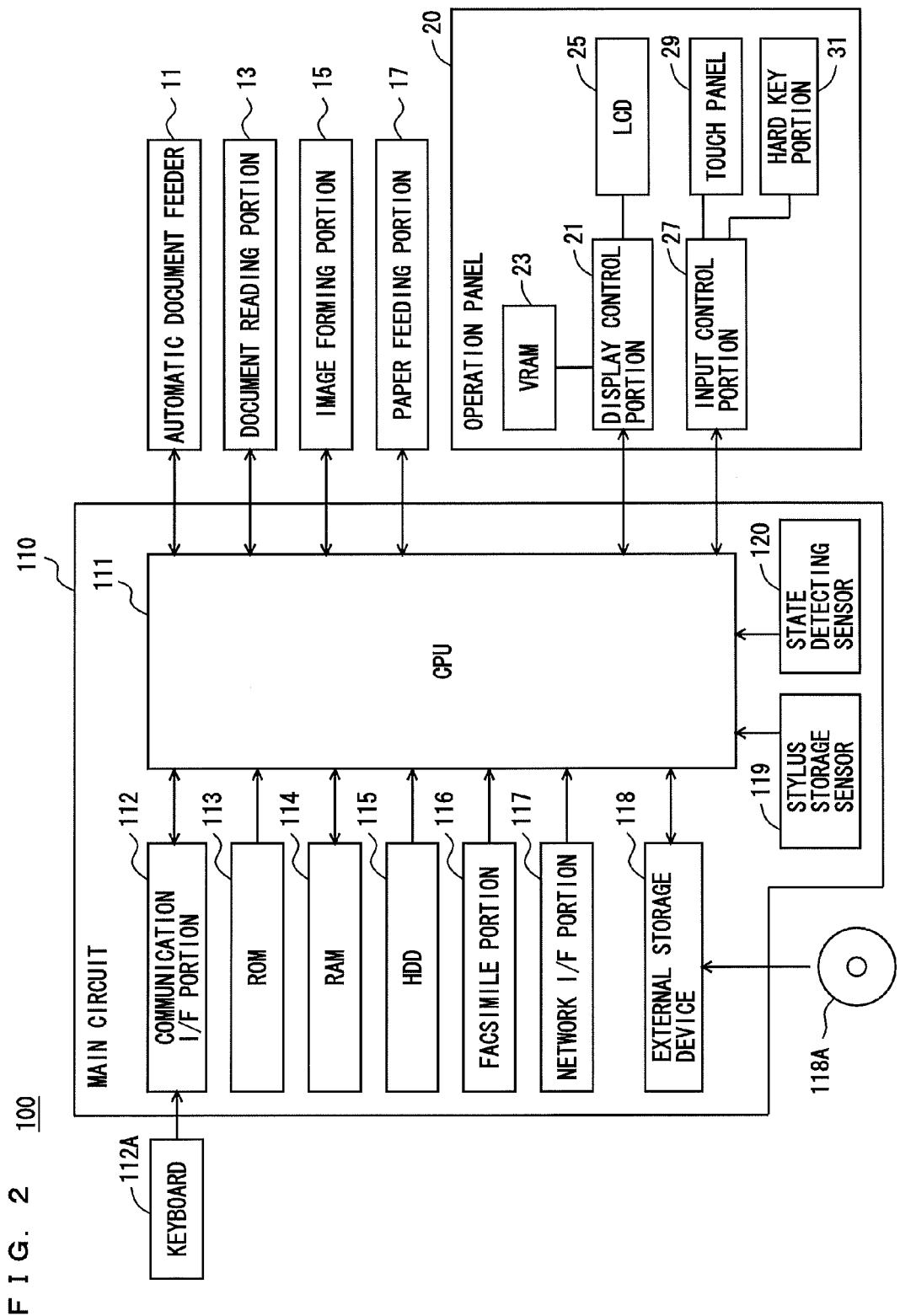
F I G. 2

FIG. 7

| USER LIST | | | |
|---|---|---|---|
| USER NAME | PASSWORD | Email | DEPARTMENT |
| USER A | ×××  | aaa@aa.jp | DEPARTMENT A |
| USER B | ○○○ | bbb@bb.jp | DEPARTMENT B |
| USER C | △△△ | ccc@cc.jp | DEPARTMENT C |
| USER D | ××○ | ddd@dd.jp | DEPARTMENT D |
| | | | |

FIG. 8

IMAGE FORMING APPARATUS WITH SETTING SCREEN, SETTING METHOD, AND NON-TRANSITORY COMPUTER-READABLE RECORDING MEDIUM ENCODED WITH SETTING PROGRAM

This application is based on Japanese Patent Application No. 2011-102528 filed with Japan Patent Office on Apr. 28, 2011, the entire content of which is hereby incorporated by reference.

BACKGROUND OF THE INVENTION

1. Field of the Invention

The present invention relates to an image forming apparatus, a setting method, and a non-transitory computer-readable recording medium encoded with a setting program. More particularly, the present invention relates to an image forming apparatus which performs processing in accordance with setting values, a setting method executed by the image forming apparatus, and a non-transitory computer-readable recording medium encoded with a setting program for causing a computer to execute the setting method.

2. Description of the Related Art

Recently, a soft keyboard has been increasingly used as a user interface in an image forming apparatus typified by a multi-function peripheral (MFP) (for example, Japanese Patent Application Laid-Open Nos. H08-221169 and 2004-252727). Using the soft keyboard can decrease the number of physical hard keys, making it possible to reduce the size of the apparatus.

On the other hand, an MFP has a display surface whose size is limited, so that a soft keyboard may have to be displayed on top of an operation screen. When the soft keyboard is displayed, a part of the operation screen may be hidden under the soft keyboard. In such a case, it may be more convenient for a user to perform an operation using a hard keyboard than to perform an operation using a soft keyboard. Further, once a soft keyboard is displayed, when a user wishes to use a hard keyboard, the user has to perform an operation of causing the soft keyboard to be no longer displayed, requiring troublesome operations.

SUMMARY OF THE INVENTION

An aspect of the present invention provides an image forming apparatus which includes: a setting screen displaying portion to display a setting screen having a setting area for setting a setting value therein; an input screen displaying portion, operable in response to designation by a user of a position within a prescribed area that is determined by the setting area in the setting screen in the state where the setting screen is being displayed, to display an input screen so as to be overlaid on the setting screen being displayed, the input screen being a screen different from the setting screen and including a plurality of input key images; a first setting value accepting portion to accept a value corresponding to the input key image designated by the user from among the plurality of input key images included in the input screen; an operation accepting portion including a plurality of hard keys; a second setting value accepting portion to accept a value corresponding to the hard key designated by the user from among the plurality of hard keys; and a display terminating portion, operable in response to acceptance of an operation of enabling the operation accepting portion in the state where the input screen is being displayed by the input screen displaying portion, to terminate the display of the input screen by the input screen displaying portion.

Another aspect of the present invention provides an image forming system including a computer and an image forming apparatus capable of communicating with the computer, wherein the image forming apparatus includes: a display portion to display an image of data received from the computer; a position detecting portion provided on a display surface of the display portion and configured to detect a position designated by a user; a position transmitting portion to transmit the position detected by the position detecting portion to the computer; an operation accepting portion to accept an operation of designating one of a plurality of input keys provided separately from the position detecting portion; and an instruction transmitting portion, operable in response to acceptance of the operation of designating one of the plurality of input keys by the operation accepting portion, to transmit an instruction accepting signal to the computer, the instruction accepting signal including a value corresponding to the one of the plurality of input keys that is specified by the accepted operation; and wherein the computer includes: a setting screen transmitting portion to transmit data of a setting screen to the image forming apparatus, the setting screen having an area for setting a setting value therein; an input screen transmitting portion, operable in response to reception of a position within a prescribed area in the setting screen from the image forming apparatus in the state where the setting screen is being displayed by the image forming apparatus, to transmit data of a setting screen overlaid with an input screen to the image forming apparatus, the setting screen overlaid with the input screen being a screen in which the input screen that is different from the setting screen and that includes a plurality of input key images is overlaid on the setting screen; a first setting value accepting portion, operable in response to reception of a position within the plurality of input key images included in the input screen from the image forming apparatus, to accept a value corresponding to the input key image that is determined by the received position; a second setting value accepting portion, operable in response to reception of the instruction accepting signal from the image forming apparatus, to accept the value that is included in the received instruction accepting signal; and a transmission terminating portion, operable in response to reception of the instruction accepting signal from the image forming apparatus after the setting screen overlaid with the input screen had been transmitted by the input screen transmitting portion to the image forming apparatus, to terminate the transmission of the data of the setting screen overlaid with the input screen by the input screen transmitting portion.

A further aspect of the present invention provides a setting method performed by an image forming apparatus provided with an operation accepting portion having a plurality of hard keys, wherein the method includes: a setting screen displaying step of displaying a setting screen having a setting area for setting a setting value therein; an input screen displaying step of, in response to designation by a user of a position within a prescribed area that is determined by the setting area in the setting screen in the state where the setting screen is being displayed, displaying an input screen so as to be overlaid on the setting screen being displayed, the input screen being a screen different from the setting screen and including a plurality of input key images; a first setting step of accepting a value corresponding to the input key image designated by the user from among the plurality of input key images included in the input screen; a second setting step of accepting a value corresponding to the hard key designated by the user from among the plurality of hard keys; and a display terminating step of, in response to acceptance of an operation of enabling the operation accepting portion in the state where the input screen is being displayed in the input screen displaying step, terminating the display of the input screen in the input screen displaying step.

A still further aspect of the present invention provides a non-transitory computer-readable recording medium encoded with a setting program performed by a computer which controls an image forming apparatus, the image forming apparatus including an operation accepting portion having a plurality of hard keys, wherein the program causes the computer to execute: a setting screen displaying step of displaying a setting screen having a setting area for setting a setting value therein; an input screen displaying step of, in response to designation by a user of a position within a prescribed area that is determined by the setting area in the setting screen in the state where the setting screen is being displayed, displaying an input screen so as to be overlaid on the setting screen being displayed, the input screen being a screen different from the setting screen and including a plurality of input key images; a first setting step of accepting a value corresponding to the input key image designated by the user from among the plurality of input key images included in the input screen; a second setting step of accepting a value corresponding to the hard key designated by the user from among the plurality of hard keys; and a display terminating step of, in response to acceptance of an operation of enabling the operation accepting portion in the state where the input screen is being displayed in the input screen displaying step, terminating the display of the input screen in the input screen displaying step.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 1 is a perspective view of an MFP according to a first embodiment of the present invention;

FIG. 2 is a block diagram schematically showing the hardware configuration of the MFP;

FIG. 7 shows a second example of the setting screen;

FIG. 8 shows a second example of the input screen that is displayed overlaid on the setting screen;

DESCRIPTION OF THE PREFERRED EMBODIMENTS

Figure 3:
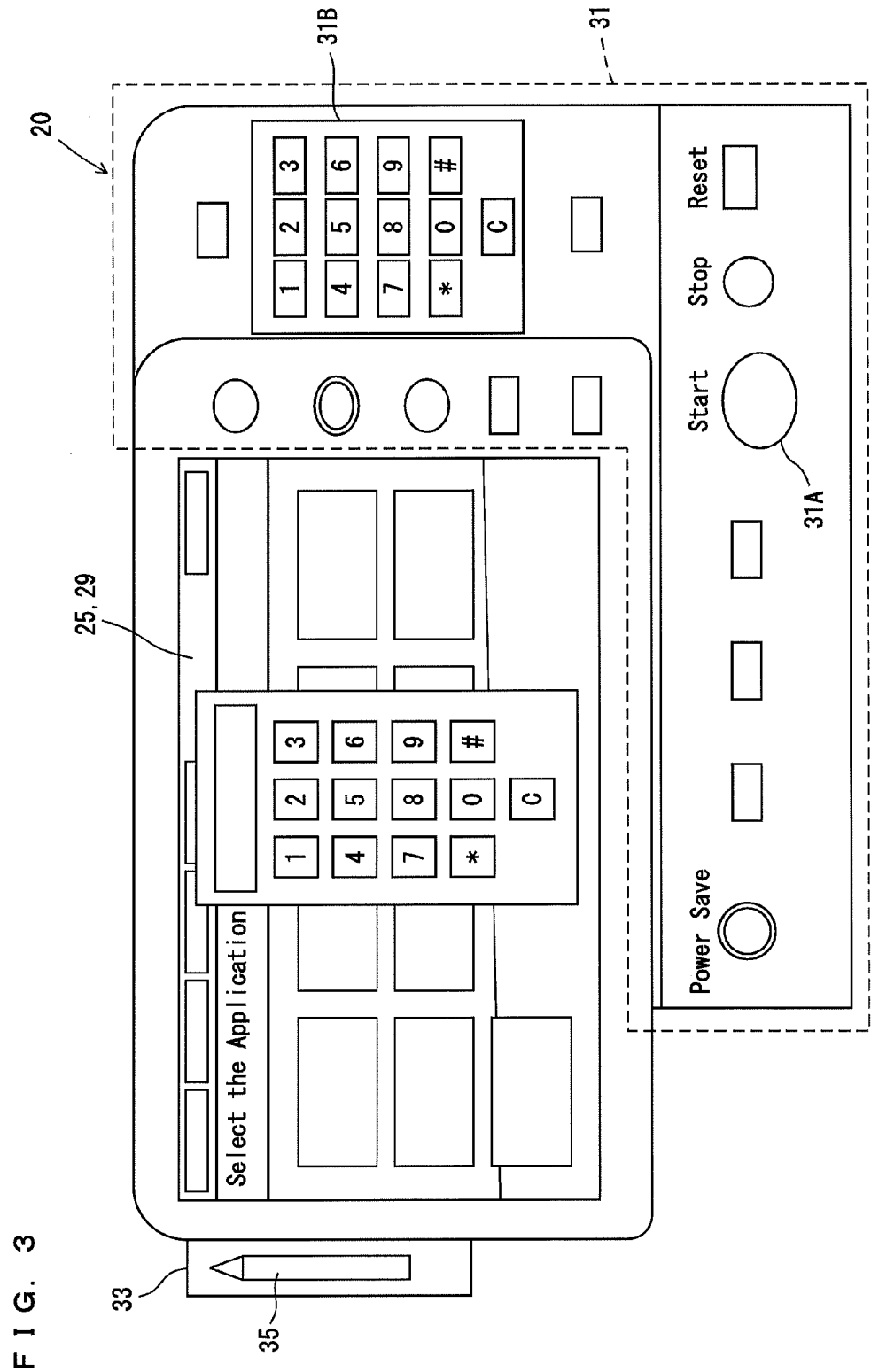
FIG. 3 is a plan view of an operation panel.

The preferred embodiments of the present invention will be described below in conjunction with the drawings. In the following description, the same or corresponding parts are denoted by the same reference characters. Their names and functions are also the same. Thus, a detailed description thereof will not be repeated.

<First Embodiment>

FIG. 1 is a perspective view of an MFP according to a first embodiment of the present invention. FIG. 2 is a block diagram schematically showing the hardware configuration of the MFP. Referring to FIGS. 1 and 2, an MFP 100 serving as an image forming apparatus includes: a main circuit 110; a document reading portion 13 for reading a document; an automatic document feeder 11 for feeding a document to document reading portion 13; an image forming portion 15 for forming an image on a sheet of paper or the like on the basis of image data which is output from document reading portion 13 that has read a document; a paper feeding portion 17 for feeding a sheet of paper to image forming portion 15; and an operation panel 20 serving as a user interface.

Operation panel 20 has an operation surface on which a liquid crystal display (LCD) 25, a touch panel 29, and a hard key portion 31 are arranged. Operation panel 20 is mounted on a body of MFP 100 so that it is rotatable about the upper edge of the operation surface. This allows the direction of the operation surface to be changed between a first position in which a user can press hard keys included in hard key portion 31, and a second position in which a user cannot press the hard keys with the operation surface facing the front of MFP 100. What is required here is that operation panel 20 is movable between the first position, in which a user can press the hard keys in hard key portion 31, and the second position, in which a user cannot press the hard keys. For example, operation panel 20 may be configured to be slid parallel to the body of MFP 100. Still alternatively, a cover member for covering the hard keys included in hard key portion 31 may be provided.

Operation panel 20 further includes a stylus storage portion 33 for receiving a stylus pen 35 for storage. Touch panel 29 detects not only a position designated with a user's finger but also a position designated with stylus pen 35.

Main circuit 110 includes: a central processing unit (CPU) 111; a communication interface (I/F) portion 112; a read only memory (ROM) 113; a random access memory (RAM) 114; a hard disk drive (HDD) 115 as a mass storage; a facsimile portion 116; a network I/F portion 117; an external storage device 118; a stylus storage sensor 119; and a state detecting sensor 120. CPU 111 is connected with automatic document feeder 11, document reading portion 13, image forming portion 15, paper feeding portion 17, and operation panel 20, and is responsible for overall control of MFP 100.

Automatic document feeder 11 automatically feeds a plurality of documents set on a document feed tray, one by one, to a predetermined document reading position set on a platen glass of document reading portion 13, and outputs the document, the image of which has been read by document reading portion 13, onto a document output tray. Document reading portion 13 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, and outputs the image data to image forming portion 15. Paper feeding portion 17 feeds a sheet of paper, stored in a paper feed tray, to image forming portion 15.

Image forming portion 15 forms an image using well-known electrophotography. Image forming portion 15 forms an image on a sheet of paper fed by paper feeding portion 17 on the basis of image data received from document reading portion 13 and subjected to various kinds of data processing such as shading compensation, or on the basis of externally received image data.

Communication I/F portion 112 is an interface for serial communication with an external device. For example, in the case where a keyboard 112A is connected to communication I/F portion 112, communication I/F portion 112 outputs a signal input from keyboard 112A, to CPU 111.

ROM 113 stores a program to be executed by CPU 111 or data necessary for execution of the program. RAM 114 is used as a work area when CPU 111 executes a program. Further, RAM 114 temporarily stores read images that are continuously transmitted from document reading portion 13.

Facsimile portion 116 is connected to public switched telephone networks (PSTN), and transmits facsimile data to or receives facsimile data from the PSTN. Facsimile portion 116 stores the received facsimile data in HDD 115, and also converts the data into print data which can be printed in image forming portion 15. Facsimile portion 116 outputs the resultant print data to image forming portion 15, thereby causing image forming portion 15 to form an image on a sheet of paper on the basis of the facsimile data received by facsimile portion 116. Further, facsimile portion 116 converts the data stored in HDD 115 to facsimile data, and transmits the same to a facsimile machine connected to the PSTN.

Network I/F portion 117 is an interface for connecting MFP 100 to a network such a local area network (LAN). Network I/F portion 117 communicates with another computer or image forming apparatus connected to the network, using a communication protocol such as the transmission control protocol (TCP) or the file transfer protocol (FTP). The network to which network I/F portion 117 is connected is a LAN. It may be connected in a wired or wireless manner. The network is not necessarily the LAN; it may be a wide area network (WAN), public switched telephone networks (PSTN), the Internet, or the like.

External storage device 118 is controlled by CPU 111, and is mounted with a compact disk-ROM (CD-ROM) 118A or a semiconductor memory.

Stylus storage sensor 119 is disposed in stylus storage portion 33 on operation panel 20 for sensing the presence or absence of stylus pen 35 in stylus storage portion 33. Stylus storage sensor 119 outputs ON signals to CPU 111 while stylus pen 35 is present in stylus storage portion 33. Stylus storage sensor 119 outputs OFF signals to CPU 111 while stylus pen 35 is not present in stylus storage portion 33. State detecting sensor 120 detects the position of operation panel 20. State detecting sensor 120 detects whether operation panel 20 is in the first position or the second position, and outputs the detected position of operation panel 20 to CPU 111. For example, an optical sensor, a proximity sensor, or a magnetometric sensor can be used for each of stylus storage sensor 119 and state detecting sensor 120.

Operation panel 20 includes: LCD 25; a display control portion 21 which controls display on LCD 25; a video RAM (VRAM) 23; touch panel 29; hard key portion 31; and an input control portion 27 which controls touch panel 29 and hard key portion 31. LCD 25 and hard key portion 31 are located on the operation surface of operation panel 20.

Display control portion 21 is connected to CPU 111, VRAM 23, and LCD 25. VRAM 23, which is used as a work area of display control portion 21, temporarily stores an image to be displayed on LCD 25. Display control portion 21, under the control of CPU 111, controls LCD 25 to cause the same to display an image stored in VRAM 23. Specifically, display control portion 21 causes LCD 25 to display a setting screen and an input screen, which will be described later.

Hard key portion 31 includes a plurality of hard keys including at least a start key and numeric keys to which the numerals 0 to 9 are assigned respectively. The hard keys are connected to input control portion 27. Each hard key outputs ON signals to input control portion 27 while being depressed by a user, whereas it outputs OFF signals to input control portion 27 while not being depressed by a user.

Touch panel 29 is provided on an upper or lower surface of LCD 25, and outputs the coordinates of the position pushed by a user to input control portion 27. Touch panel 29 detects a position designated by a user with his/her finger or stylus pen 35, and outputs the coordinates of the detected position to input control portion 27. Touch panel 29 preferably has a size equal to or greater than that of the display surface of LCD 25. As touch panel 29 is provided on the surface of LCD 25, when a user designates a position on the display surface of LCD 25, touch panel 29 outputs to input control portion 27 the coordinates of the position that the user has designated on the display surface of LCD 25. Touch panel 29 may be, for example, of a resistive type, a surface acoustic wave type, an infrared ray type, an electromagnetic induction type, or a capacitance type, although it is not limited to these types.

If there is any hard key that outputs ON signals in hard key portion 31, input control portion 27 outputs key identification information for identifying the hard key that outputs the ON signals, to CPU 111. In the event that touch panel 29 detects a position designated by a user, input control portion 27 outputs the coordinates that are output from touch panel 29, to CPU 111.

FIG. 3 is a plan view of operation panel 20. Referring to FIG. 3, operation panel 20 includes LCD 25, touch panel 29 overlaid on LCD 25, hard key portion 31 having a plurality of hard keys arranged to the right of and below LCD 25, and stylus storage portion 33. Hard key portion 31 includes a start key 31A and a numeric keypad 31B.

Figure 4:
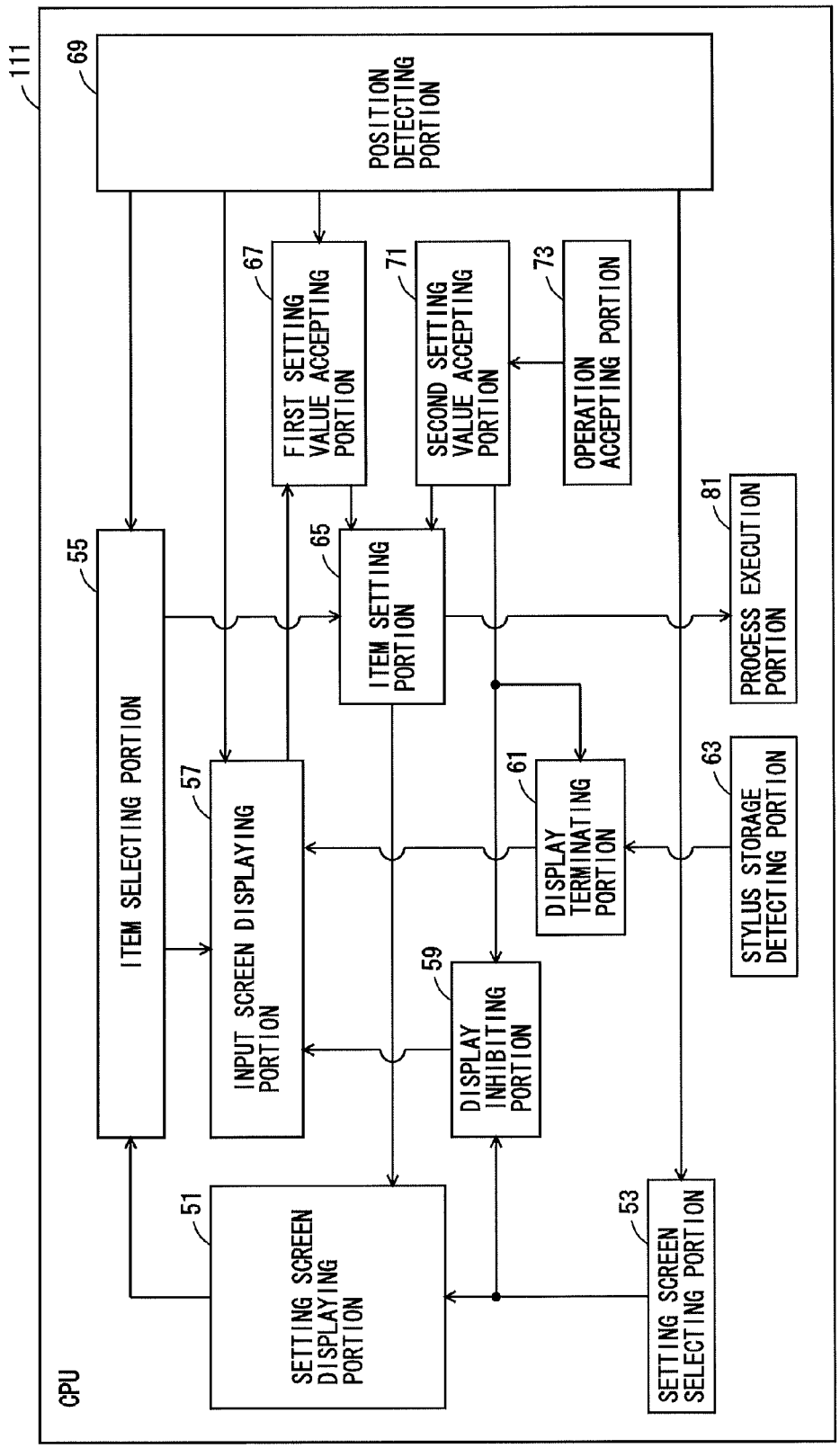
FIG. 4 is a block diagram showing, by way of example, the functions of a CPU included in the MFP according to the first embodiment.

FIG. 4 is a block diagram showing, by way of example, the functions of a CPU included in the MFP according to the first embodiment. The functions shown in FIG. 4 are implemented by CPU 111 included in MFP 100 as CPU 111 executes a program stored in ROM 113, HDD 115, or CD-ROM 118A. Referring to FIG. 4, CPU 111 includes: a setting screen selecting portion 53 which selects a setting screen; a setting screen displaying portion 51 which displays a setting screen; an item selecting portion 55 which selects a setting item; an input screen displaying portion 57 which displays an input screen; a display inhibiting portion 59 which inhibits the display of an input screen; a display terminating portion 61 which terminates the display of an input screen; a stylus storage detecting portion 63 which detects the presence or absence of stylus pen 35 in its storage portion; an item setting portion 65 which sets a setting value for a setting item; a first setting value accepting portion 67; a position detecting portion 69 which detects a position designated on the display surface of LCD 25; an operation accepting portion 73 which accepts an operation input into hard key portion 31; a second setting value accepting portion 71; and a process execution portion 81 which performs processing.

Process execution portion 81 controls network I/F portion 117, facsimile portion 116, HDD 115, external storage device 118, automatic document feeder 11, document reading portion 13, image forming portion 15, and paper feeding portion 17, to perform processing under the processing conditions set by item setting portion 65.

The processing performed by process execution portion 81 includes, for example, scan processing, copy processing, print processing, and facsimile transmission/reception processing. When the setting is made to perform scan processing as one of the processing conditions, process execution portion 81 controls automatic document feeder 11, document reading portion 13, HDD 115, external storage device 118, and network I/F portion 117, so as to cause an image of a document read by document reading portion 13 to be output to at least one of HDD 115, external storage device 118, and network I/F portion 117, in accordance with the processing conditions. When the processing condition to set HDD 115 as a destination is set as one of the processing conditions, process execution portion 81 stores the image in HDD 115. When the processing condition to set external storage device 118 as a destination is set as one of the processing conditions, process execution portion 81 stores the image in a semiconductor memory mounted on external storage device 118. When the processing condition to set network I/F portion 117 as a destination is set as one of the processing conditions, process execution portion 81 transmits the image via network I/F portion 117. The image may be transmitted by e-mail, or by using the file transfer protocol (FTP), server message block (SMB), or the like. In the case where e-mail is set as the transmission method, e-mail having the image attached thereto is generated for transmission.

When the setting is made to perform copy processing as one of the processing conditions, process execution portion 81 controls automatic document feeder 11, document reading portion 13, paper feeding portion 17, and image forming portion 15, so as to cause image forming portion 15 to form an image of a document read by document reading portion 13 on a sheet of paper supplied from paper feeding portion 17, in accordance with the processing conditions that have been set.

When the setting is made to perform print processing as one of the processing conditions, process execution portion 81 controls network I/F portion 117, HDD 115, external storage device 118, image forming portion 15, and paper feeding portion 17, so as to cause image forming portion 15 to form an image on a sheet of paper supplied from paper feeding portion 17, in accordance with the processing conditions that have been set. The image to be formed by image forming portion 15 is set by one of the processing conditions. It may be an image of print data that is received from a computer connected to a network via network I/F portion 117, or an image of data stored in HDD 115 or external storage device 118.

Furthermore, when the setting is made to perform facsimile transmission processing as one of the processing conditions, process execution portion 81 controls automatic document feeder 11, document reading portion 13, HDD 115, external storage device 118, and facsimile portion 116, so as to cause facsimile portion 116 to transmit an image of facsimile data. The facsimile data to be transmitted by facsimile portion 116 is set by one of the processing conditions. It may be an image that document reading portion 13 reads from a document and outputs in accordance with the processing conditions, or an image stored in HDD 115 or external storage device 118.

When the setting is made to perform facsimile reception processing as one of the processing conditions, process execution portion 81 controls facsimile portion 116, HDD 115, external storage device 118, image forming portion 15, and paper feeding portion 17, so as to output an image of facsimile data. When the processing condition to set HDD 115 as a destination is set as one of the processing conditions, process execution portion 81 stores the image of facsimile data in HDD 115. When the processing condition to set external storage device 118 as a destination is set as one of the processing conditions, process execution portion 81 stores the image of facsimile data in a semiconductor memory mounted on external storage device 118. When the processing condition to set network I/F portion 117 as a destination is set as one of the processing conditions, process execution portion 81 generates e-mail having the image of facsimile data attached thereto, and transmits the e-mail via network I/F portion 117.

Position detecting portion 69 acquires a position detected by touch panel 29 and output from input control portion 27. Position detecting portion 69 outputs the coordinates of the detected position to item selecting portion 55, input screen displaying portion 57, first setting value accepting portion 67, and setting screen selecting portion 53.

Setting screen selecting portion 53 selects one of a plurality of setting screens stored in advance in HDD 115, and outputs setting screen identification information for identifying the selected setting screen to setting screen displaying portion 51 and display inhibiting portion 59.

The setting screens correspond respectively to a plurality of processing conditions for process execution portion 81 to perform processing. For example, the setting screens include a setting screen for causing process execution portion 81 to perform scan processing, a setting screen for causing process execution portion 81 to perform copy processing, a setting screen for causing process execution portion 81 to perform print processing, and a setting screen for causing process execution portion 81 to perform facsimile transmission/reception processing. The setting screen is used to set a setting value for each of a plurality of setting items which determine the processing conditions for process execution portion 81 to perform the processing. The setting screen has, as a setting area for setting setting values, an area for displaying an item name for each of a plurality of setting items. The setting screen also has, as the setting area for setting the setting values, an area for displaying a setting value for each setting item, in addition to or separately from the area for displaying the item name. Further, the setting screens include a setting screen provided with a transition function. The setting screen with the transition function has at least one transition button allowing a user to select another setting screen.

For example, setting screen selecting portion 53 displays on LCD 25 a menu screen that includes a plurality of pieces of setting screen identification information for identifying the respective setting screens. When a user operates touch panel 29 to designate one of the plurality of pieces of setting screen identification information displayed on the menu screen, setting screen selecting portion 53 specifies the setting screen identification information designated by the user, on the basis of the coordinates of the position input from position detecting portion 69, and selects the setting screen that corresponds to the specified setting screen identification information. In the state where a setting screen with the transition function is displayed on LCD 25, when a user operates touch panel 29 to designate a transition button included in the setting screen with the transition function, setting screen selecting portion 53 specifies the transition button designated by the user, on the basis of the coordinates of the position input from position detecting portion 69, and selects the setting screen that is associated with the specified transition button.

When setting screen displaying portion 51 receives setting screen identification information from setting screen selecting portion 53, setting screen displaying portion 51 reads from HDD 115 the setting screen specified by the setting screen identification information, and displays the read setting screen on LCD 25. More specifically, setting screen displaying portion 51 outputs the setting screen to display control portion 21, to cause display control portion 21 to display the image of the setting screen on LCD 25. Setting screen displaying portion 51 outputs the setting screen displayed on LCD 25, to item selecting portion 55.

Item selecting portion 55 selects, as a process target, one of the plurality of setting items included in the setting screen that has been selected by a user. Specifically, when a user designates one of the images of the plurality of item names displayed on LCD 25 with his/her finger, touch panel 29 detects the position designated by the user. Item selecting portion 55 specifies which one of the images of the item names has been designated by the user, on the basis of the coordinates of the position detected by touch panel 29 and input from position detecting portion 69, and selects, as the process target, the setting item that corresponds to the specified item name image. Item selecting portion 55 outputs the item name of the setting item, selected as the process target from among the plurality of setting items, to input screen displaying portion 57 and item setting portion 65.

When input screen displaying portion 57 receives an item name from item selecting portion 55, input screen displaying portion 57 displays an input screen corresponding to the received item name. The input screen is overlaid on the setting screen being displayed on LCD 25. For each item name, an attribute of a setting value which is set for a setting item specified by the item name is predetermined, and the input screen includes a plurality of input key images corresponding to the attribute. The attribute includes text or numeric, and in the case of the text, its type (i.e. kana characters or alphabet letters). Specifically, in the case where the attribute of the setting value to be set for the setting item is numeric, at least ten input key images are displayed to which the numerals 0 to 9 are respectively assigned. In the case where the attribute of the setting item is text, at least 26 input key images are displayed to which the letters of the alphabet are respectively assigned. The numerals or letters assigned to the input key images become the key names thereof. Input screen displaying portion 57 causes display control portion 21 to generate an image by synthesizing the images of the input screen and the setting screen, while giving higher priority to the input screen than to the setting screen, and further causes display control portion 21 to display the generated image on LCD 25. Input screen displaying portion 57 outputs a position on the setting screen where the input screen is located, to first setting value accepting portion 67.

First setting value accepting portion 67 accepts a setting value on the basis of one of the input key images, in the input screen, that has been selected by a user. When a user designates, with his/her finger, any of the plurality of input key images displayed on LCD 25, touch panel 29 detects the position designated by the user. First setting value accepting portion 67 receives from position detecting portion 69 the coordinates on the display surface of LCD 25 that have been detected by touch panel 29, specifies which one of the input key images has been designated by the user on the basis of the received coordinates, and accepts the value corresponding to the specified input key image. First setting value accepting portion 67 outputs the accepted value, as a setting value, to item setting portion 65.

In the case where a user designates two or more input key images successively, first setting value accepting portion 67 arranges the values corresponding respectively to the designated input key images in the accepted order to obtain a value, and outputs the obtained value as the setting value to item setting portion 65. For example, in the state where the numerals "0" to "9" are assigned respectively to the ten input key images, when the input key image to which the numeral "1" is assigned is designated in the first place and the input key image to which the numeral "2" is assigned is designated in the second place, then the value "12", with the second numeral "2" arranged to the right of the first numeral "1", is determined as the setting value, and the setting value "12" is output to item setting portion 65. In the case where the letters of the alphabet are assigned respectively to the 26 input key images, a string of a plurality of letters, arranged in the input order, is output as the setting value to item setting portion 65.

Operation accepting portion 73 accepts key identification information of a hard key which is output from input control portion 27. Operation accepting portion 73 outputs the accepted key identification information to second setting value accepting portion 71. When a user presses one of a plurality of hard keys included in hard key portion 31, input control portion 27 outputs the key identification information of the hard key depressed by the user. Therefore, operation accepting portion 73 outputs the key identification information of the hard key depressed by the user, among the plurality of hard keys included in hard key portion 31, to second setting value accepting portion 71. In the case where keyboard 112A is connected to communication I/F portion 112, when a user operates keyboard 112A, operation accepting portion 73 accepts from communication I/F portion 112 the key identification information of the key depressed by the user. Operation accepting portion 73 then outputs the key identification information of the key operated by the user, among the plurality of keys included in keyboard 112A connected to communication I/F portion 112, to second setting value accepting portion 71.

Second setting value accepting portion 71 accepts a value that corresponds to the key identification information input from operation accepting portion 73. Second setting value accepting portion 71 outputs the accepted value as a setting value to item setting portion 65. When second setting value accepting portion 71 receives a plurality of pieces of key identification information successively from operation accepting portion 73, second setting value accepting portion 71 outputs a value in which a plurality of values corresponding to the respective pieces of key identification information are arranged in the accepted order thereof, as the setting value, to item setting portion 65. For example, when the key identification information of the hard key to which the numeral "1" is assigned is received in the first place and the key identification information of the hard key to which the numeral "2" is assigned is received in the second place, then the value "12", with the second numeral "2" arranged to the right of the first numeral "1", is determined as the setting value, and the setting value "12" is output to item setting portion 65. In the case where a plurality of pieces of key identification information of the hard keys to which the letters of the alphabet are respectively assigned are received, a string of the plurality of letters, arranged in the input order, is output as the setting value to item setting portion 65. Further, when second setting value accepting portion 71 receives the key identification information from operation accepting portion 73, second setting value accepting portion 71 outputs an enable signal to display inhibiting portion 59 and display terminating portion 61.

Stylus storage detecting portion 63 is connected to stylus storage sensor 119 and receives ON signals or OFF signals therefrom. Stylus storage sensor 119 outputs ON signals while stylus pen 35 is present in stylus storage portion 33, whereas it outputs OFF signals while stylus pen 35 is not in stylus storage portion 33. While stylus storage sensor 119 is outputting ON signals, stylus storage detecting portion 63 outputs stylus storage signals, indicating that stylus pen 35 is in its storage portion, to display terminating portion 61. On the other hand, while stylus storage sensor 119 is outputting OFF signals, stylus storage detecting portion 63 outputs stylus in-use signals, indicating that stylus pen 35 is in use, to display terminating portion 61.

Display terminating portion 61 receives either a stylus storage signal or a stylus in-use signal from stylus storage detecting portion 63, and receives an enable signal from second setting value accepting portion 71. When an enable signal is input from second setting value accepting portion 71, display terminating portion 61 outputs a terminate signal to input screen displaying portion 57. During the time when the stylus in-use signals are being input from stylus storage detecting portion 63, however, display terminating portion 61 refrains from outputting the terminate signal to input screen displaying portion 57 even if the enable signal is input from second setting value accepting portion 71. In other words, display terminating portion 61 outputs the terminate signal to input screen displaying portion 57 in response to reception of the enable signal from second setting value accepting portion 71 while the stylus storage signals are being input from stylus storage detecting portion 63. While the stylus in-use signals are being input from stylus storage detecting portion 63, stylus pen 35 has been taken out of stylus storage portion 33 and is being used by a user. In this state, there is a possibility that the user may use stylus pen 35 to designate an input key image included in the input screen.

Further, when display terminating portion 61 receives an enable signal from second setting value accepting portion 71, display terminating portion 61 outputs a terminate signal to input screen displaying portion 57 on the condition that the input screen overlaps the setting item or an area related to the setting item included in the setting screen. In other words, even if the enable signal is input from second setting value accepting portion 71, if the input screen does not overlap the setting item or the area related to the setting item included in the setting screen, display terminating portion 61 outputs no terminate signal to input screen displaying portion 57. The area related to the setting item is, for example, an item name thereof. In the case where the setting screen includes more than one setting item, display terminating portion 61 outputs the terminate signal in the case where the input screen overlaps any one of the plurality of setting items and the areas related thereto.

Display inhibiting portion 59 receives setting screen identification information from setting screen selecting portion 53, and receives an enable signal from second setting value accepting portion 71. After the setting screen identification information is input from setting screen selecting portion 53, when the enable signal is input from second setting value accepting portion 71, display inhibiting portion 59 outputs inhibit signals to input screen displaying portion 57 until another piece of setting screen identification information is input from setting screen selecting portion 53.

When input screen displaying portion 57 receives a terminate signal from display terminating portion 61 while it is displaying an input screen, input screen displaying portion 57 terminates the display of that input screen. After a user has selected an operation of inputting a setting value using either hard key portion 31 or keyboard 112A connected to communication I/F portion 112, the display of the input screen is ceased. This allows the user to input the setting value while viewing the entire setting screen.

Further, as long as the inhibit signals are being input from display inhibiting portion 59, even if an item name is input from item selecting portion 55, input screen displaying portion 57 refrains from displaying the input screen corresponding to the input item name on LCD 25. In other words, in response to reception of an item name from item selecting portion 55, input screen displaying portion 57 displays on LCD 25 the input screen corresponding to the input item name, on the condition that no inhibit signal is input from display inhibiting portion 59. In the case where the setting screen being displayed on LCD 25 includes more than one setting item, when a user has selected one of the setting items, input screen displaying portion 57 displays the input screen overlaid on the setting screen. However, if the user wishes to input a setting value for one setting item using the hard keys included in hard key portion 31 or keyboard 112A connected to communication I/F portion 112, it is highly likely that the user will wish to input a setting value for another setting item using hard key portion 31 or keyboard 112A as well, rather than using the input screen. When the input screen is overlaid on the setting screen, a part of the setting screen will be hidden under the input screen, which is undesirable. Therefore, after the user has selected an operation of inputting a setting value using hard key portion 31 or keyboard 112A on one setting screen, the input screen is kept from being displayed, to allow the user to continue the operations using hard key portion 31 or keyboard 112A. This may facilitate the user operations.

Item setting portion 65 receives an item name of a setting item from item selecting portion 55, and receives a setting value from first setting value accepting portion 67 or second setting value accepting portion 71. When receiving a setting value from first setting value accepting portion 67 or second setting value accepting portion 71, item setting portion 65 temporarily stores in RAM 114 a set of the setting value and the item name of the setting item that has been received from item selecting portion 55 prior to the reception of the setting value. Whenever receiving a setting value from first setting value accepting portion 67 or second setting value accepting portion 71, item setting portion 65 temporarily stores a set of the setting value and the item name of the setting item into RAM 114, until a setting instruction is detected. This means that two or more sets may be temporarily stored in RAM 114. The setting instruction is input by a user as the user presses a predetermined hard key included in hard key portion 31, for example. Item setting portion 65 detects the setting instruction by detecting the event that the predetermined hard key switches from OFF to ON.

Meanwhile, ROM 113 stores, for each piece of setting screen identification information, default setting values predetermined respectively for a plurality of setting items. Before a setting instruction is detected, item setting portion 65 reads the default setting values for the respective setting items that are stored in ROM 113 in correspondence with the setting screen identification information received from setting screen selecting portion 53, and stores a plurality of sets of the default setting values and the item names of the corresponding setting items, as processing conditions, into RAM 114. When a setting instruction is detected, item setting portion 65 outputs the set of the setting value and the item name of the setting item temporarily stored in RAM 114 to setting screen displaying portion 51, and further, updates the processing conditions on the basis of the set of the setting value and the item name of the setting item temporarily stored in RAM 114. More specifically, item setting portion 65 selects a set temporarily stored in RAM 114, extracts, from the plurality of sets stored in RAM 114 as the processing conditions, a set including the default setting value for the same item name of the setting item as the one being included in the selected set, and updates the default setting value in the extracted set with the setting value included in the selected set.

Whenever a setting instruction is detected, item setting portion 65 updates the setting value that has been stored in RAM 114 as the processing condition with the setting value that has been input from first setting value accepting portion 67 or second setting value accepting portion 71 and temporarily stored in RAM 114, until an execution instruction is input by the user. Every time the setting instruction is detected, item setting portion 65 updates the processing condition, and further outputs the set of the setting value and the item name of the setting item temporarily stored in RAM 114, to setting screen displaying portion 51.

The execution instruction is issued by a user as the user presses start key 31A provided on operation panel 20, for example. When item setting portion 65 detects the depression of start key 31A, item setting portion 65 determines that the execution instruction has been issued by the user.

Whenever the set of the setting value and the item name of the setting item is input from item setting portion 65, setting screen displaying portion 51 updates the setting screen being displayed on LCD 25. More specifically, setting screen displaying portion 51 recomposes a setting screen by arranging the image of the setting value received from item setting portion 65 in the area for displaying the setting value corresponding to the setting item on the setting screen, and displays the recomposed setting screen on LCD 25. In this manner, the setting value that a user has input as the setting value is displayed on the setting screen, allowing the user to confirm the setting value by checking the setting screen. It is noted, as the input screen is being displayed, an image having the image of the input screen overlaid on the image of the setting screen is displayed on LCD 25 by display control portion 21.

When item setting portion 65 determines that the execution instruction has been issued by the user, item setting portion 65 outputs a process execution instruction to process execution portion 81. The process execution instruction includes the sets of the setting values and the setting items that are stored as the processing conditions in RAM 114. When receiving a process execution instruction, process execution portion 81 executes processing in accordance with the processing conditions included in the process execution instruction. The processing to be executed by process execution portion 81 is determined by the setting screen that is displayed by setting screen displaying portion 51. In the case where a setting screen for setting the processing conditions for scan processing is being displayed by setting screen displaying portion 51, process execution portion 81 executes the scan processing. In the case where a setting screen for setting the processing conditions for copy processing is being displayed by setting screen displaying portion 51, process execution portion 81 executes the copy processing. In the case where a setting screen for setting the processing conditions for print processing is being displayed by setting screen displaying portion 51, process execution portion 81 executes the print processing. In the case where a setting screen for setting the processing conditions for facsimile transmission/reception processing is being displayed by setting screen displaying portion 51, process execution portion 81 executes the facsimile transmission/reception processing.

Figure 5:
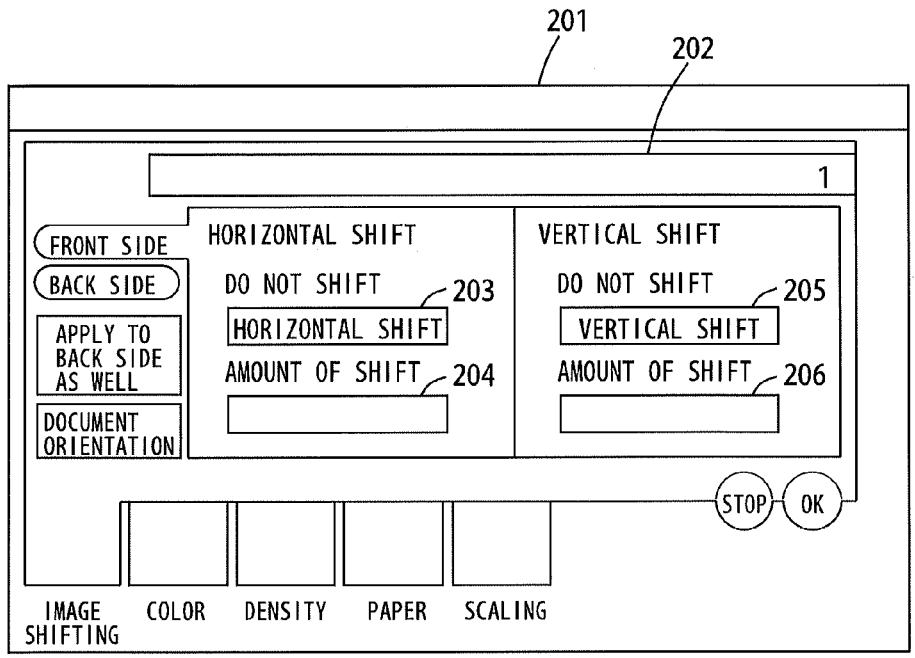
FIG. 5 shows a first example of a setting screen.

FIG. 5 shows a first example of a setting screen. Referring to FIG. 5, a setting screen 201 includes an area 202 for inputting therein a setting value for a setting item having the item name "number of copies", an image 203 of an item name "horizontal shift", an area 204 for inputting therein a setting value for the setting item having the item name "horizontal shift", an image 205 of an item name "vertical shift", and an area 206 for inputting therein a setting value for the setting item having the item name "vertical shift".

Figure 6:
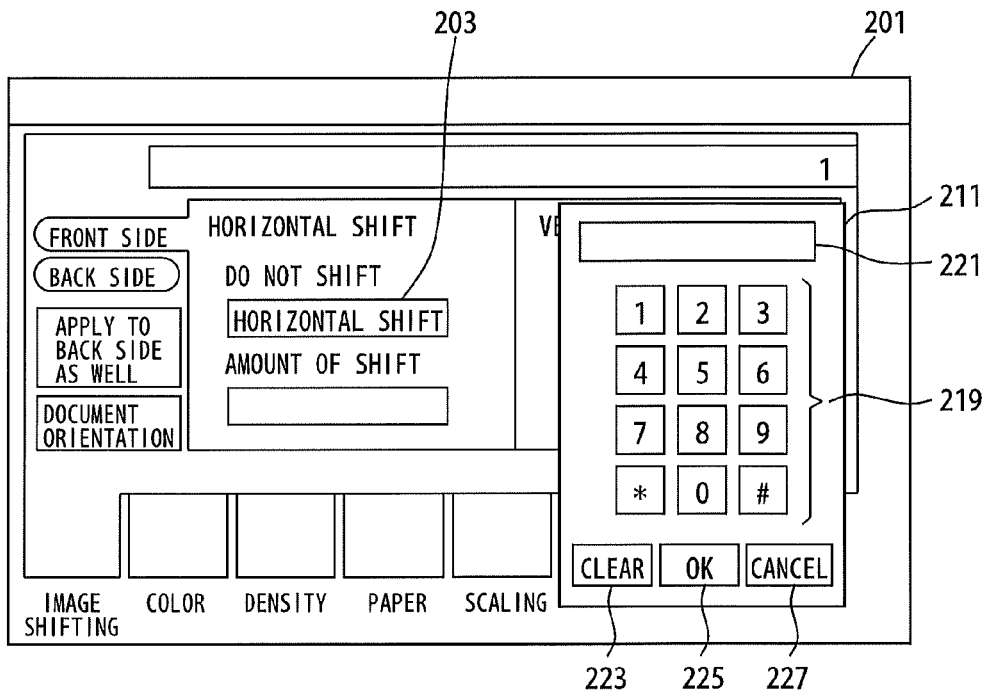
FIG. 6 shows a first example of an input screen that is displayed overlaid on the setting screen.

FIG. 6 shows a first example of an input screen that is displayed overlaid on a setting screen. An input screen 211 shown in FIG. 6 corresponds to the setting item having the item name "horizontal shift" that is included in setting screen 201. Referring to FIG. 6, input screen 211 includes an area 221 for displaying a setting value, a plurality of input key images 219, a clear key image 223, an OK key image 225, and a cancel key image 227.

The plurality of input key images 219 include ten input key images to which the numerals 0 to 9 are respectively assigned and two input key images to which the symbols "*" and "#" are respectively assigned. Clear key image 223 is assigned a command to cancel the setting value that the user has input by designating any of input key images 219. OK key image 225 is assigned a command to accept the input setting value. Cancel key image 227 is assigned a command to return the input setting value to the default setting value.

FIG. 7 shows a second example of the setting screen. Referring to FIG. 7, a setting screen 231 includes a user list. The user list displays, for example, information about users who have been permitted to use MFP 100. Here, it is assumed that the user list includes the fields of "user name", "password", "e-mail", and "department (to which the user belongs)". Designating a setting item 233 enables a setting value for that setting item 233 to be input.

FIG. 8 shows a second example of the input screen that is displayed overlaid on a setting screen. An input screen 241 shown in FIG. 8 corresponds to setting item 233 that is included in setting screen 231 shown in FIG. 7. Referring to FIG. 8, input screen 241 includes an area 251 for displaying a setting value, a plurality of input key images 253, a cancel key image 255, and an OK key image 257.

The plurality of input key images 253 include at least input key images to which the alphabet letters "A" to "Z" are respectively assigned. OK key image 257 is assigned a command to accept the input setting value. Cancel key image 255 is assigned a command to erase the input setting value.

Figure 9:
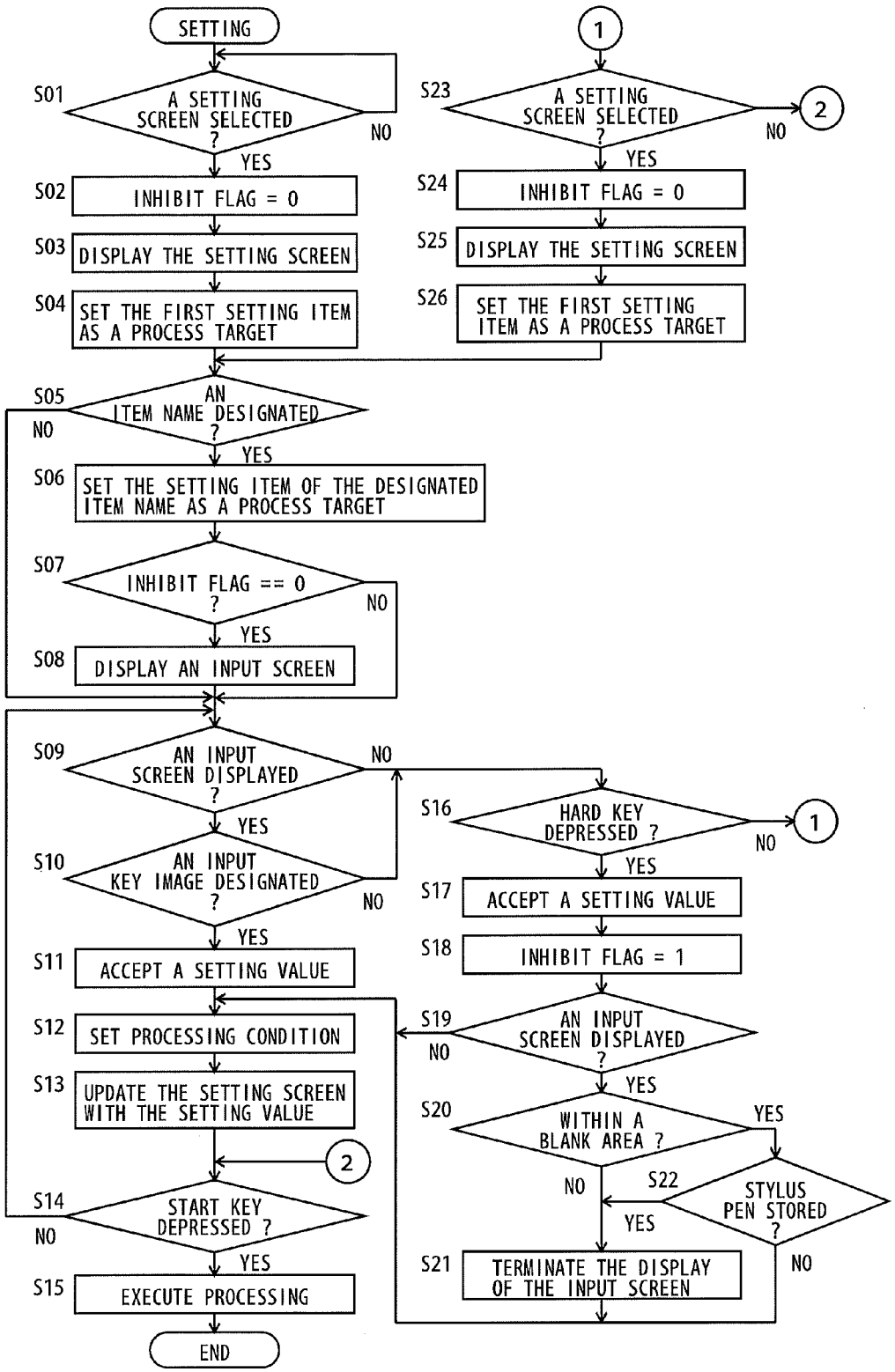
FIG. 9 is a flowchart illustrating an example of the flow of a setting process.

FIG. 9 is a flowchart illustrating an example of the flow of a setting process. The setting process is carried out by CPU 111 included in MFP 100 as CPU 111 executes a setting program stored in ROM 113, HDD 115, or CD-ROM 118A.

Referring to FIG. 9, CPU 111 determines whether a setting screen has been selected (step S01). In the state where a menu screen is being displayed on LCD 25, when a user selects one of a plurality of pieces of setting screen identification information included in the menu screen, or in the state where a setting screen with the transition function is being displayed on LCD 25, when the user selects a transition button, then CPU 111 determines that a setting screen has been selected. CPU 111 is in a standby mode until a setting screen is selected ("NO" in step S01), and once the setting screen is selected ("YES" in step S01), the process proceeds to step S02.

In step S02, an inhibit flag is set to "0". The inhibit flag is set to "1" in step S18, which will be described later. The inhibit flag specifies whether the display of the input screen is inhibited or not. The inhibit flag set to "1" indicates the state where the display of the input screen is inhibited. The inhibit flag set to "0" indicates the state where the display of the input screen is uninhibited.

In the following step S03, CPU 111 displays the setting screen selected in step S01 on LCD 25. In the case where one of the plurality of pieces of setting screen identification information is selected by the user on the menu screen being displayed on LCD 25, CPU 111 displays on LCD 25 the setting screen specified by the selected setting screen identification information. In the case where the transition button is selected by the user on the setting screen with the transition function being displayed on LCD 25, CPU 111 displays on LCD 25 the setting screen specified by the setting screen identification information that is assigned to that transition button. The setting screen has item names of a plurality of setting items corresponding respectively to a plurality of setting values that determine processing conditions, and areas for displaying the setting values that are set for the respective setting items.

In the following step S04, CPU 111 sets a first setting item as a process target. More specifically, from among the plurality of setting items included in the setting screen displayed on LCD 25 in step S03, the first setting item is set as the process target. It is noted that the setting item to be set as the process target is not limited to the first one of the setting items included in the setting screen; a predetermined setting item may be set as the process target.

In the following step S05, CPU 111 determines whether one of the plurality of item names of the setting items included in the setting screen has been designated by a user. If so, the process proceeds to step S06; otherwise, the process proceeds to step S09. In step S06, CPU 111 sets the setting item having the item name designated in step S05 as the process target, and the process proceeds to step S07. In step S07, it is determined whether the inhibit flag has been set to "0". If so, the process proceeds to step S08; otherwise, the process proceeds to step S09, with step S08 being skipped.

In step S08, an input screen is displayed overlaid on the setting screen, and the process proceeds to step S09. Specifically, the attribute of the setting value for the setting item that has been set as the process target is acquired, and an input screen including the input key images to which values of that attribute are assigned is displayed. In the case where the attribute is numeric, an input screen including at least ten input key images to which the numerals 0 to 9 are respectively assigned is displayed. In the case where the attribute is text, an input screen including at least 26 input key images to which the alphabet letters A to Z are respectively assigned is displayed.

In step S09, CPU 111 determines whether an input screen is being displayed. If an input screen is being displayed on LCD 25, the process proceeds to step S10; otherwise, the process proceeds to step S16. In step S10, CPU 111 determines whether an input key image has been designated. When a user designates an input key image with his/her finger, CPU 111 specifies the input key image designated by the user, from the coordinates detected by touch panel 29, and determines that the specified input key image has been designated. If an input key image has been designated, the process proceeds to step S11; otherwise, the process proceeds to step S16. In the following step S11, CPU 111 accepts a value corresponding to the input key image designated in step S10 as a setting value, and the process proceeds to step S12. In the case where two or more input key images are designated, a value obtained by arranging the values corresponding to the respective input key images in the designated order thereof is accepted as the setting value.

In step S12, a set of the setting item that has been set as the process target and the setting value that has been accepted in step S11 is set as the processing condition. At this stage, the processing condition is temporarily stored in RAM 114. In the following step S13, the setting screen is updated with the setting value, and the process proceeds to step S14. Specifically, in the setting screen being displayed on LCD 25, the setting value accepted in step S11 is displayed in the area for displaying the setting value corresponding to the setting item that has been set as the process target. This can inform the user that the setting value input by the user has been set.

On the other hand, in step S16, CPU 111 determines whether a hard key has been depressed. When CPU 111 detects that a user has pressed one of the plurality of hard keys included in hard key portion 31, CPU 111 determines that the hard key has been depressed. In the case where keyboard 112A is connected to communication I/F portion 112, when communication I/F portion 112 detects that key identification information has been input from keyboard 112A, CPU 111 determines that the hard key has been depressed. If a hard key has been depressed, the process proceeds to step S17; otherwise, the process proceeds to step S23.

In step S17, CPU 111 accepts a value corresponding to the hard key depressed in step S16 as the setting value, and the process proceeds to step S18. In the case where two or more hard keys are designated, a value obtained by arranging the values corresponding to the respective hard keys in the pressed order thereof is accepted as the setting value. In step S18, the inhibit flag is set to "1". CPU 111 then determines whether an input screen is being displayed (step S19). If an input screen is being displayed on LCD 25, the process proceeds to step S20; otherwise, the process proceeds to step S12.

In step S20, CPU 111 determines whether the input screen is being displayed within a blank area of the setting screen. The blank area refers to the area within the setting screen other than the areas of the setting items and item names. If the input screen is being displayed within the blank area of the setting screen, the process proceeds to step S22; otherwise, the process proceeds to step S21. In step S22, CPU 111 determines whether stylus pen 35 is stored in stylus storage portion 33. When the signal output from stylus storage sensor 119 is an ON signal, CPU 111 determines that the pen is stored in its storage portion. When the signal output from stylus storage sensor 119 is an OFF signal, CPU 111 determines that the pen is not stored in its storage portion. If stylus pen 35 is stored in stylus storage portion 33, the process proceeds to step S21; otherwise, the process proceeds to step S12. In step S21, the display of the input screen being displayed on LCD 25 is terminated, and the process proceeds to step S12. This is because the input screen will not be used when hard key portion 31 is used to input a setting value. Moreover, the part within the setting screen that had been hidden under the input screen becomes visible.

In step S12, a set of the setting item that has been set as the process target and the setting value that has been accepted in step S17 is set as the processing condition. At this stage, the processing condition is temporarily stored in RAM 114. In the following step S13, the setting screen is updated with the setting value, and the process proceeds to step S14. Specifically, in the setting screen being displayed on LCD 25, the setting value accepted in step S17 is displayed in the area for displaying the setting value corresponding to the setting item that has been set as the process target. This can inform the user that the setting value input by the user has been set.

In step S14, CPU 111 determines whether start key 31A has been depressed. If so, the process proceeds to step S15; otherwise, the process returns to step S09. In step S15, processing is executed in accordance with the processing conditions, and the process is terminated. As to the one or more setting items for which step S12 has been executed, the default setting values of the respective setting items stored in ROM 113 are updated with the setting values of the setting items temporarily stored in step S12, and the processing is executed in accordance with the updated processing conditions. As to the one or more setting items for which step S12 has not been executed, the processing is executed in accordance with the processing conditions that include the default setting values of the respective setting items stored in ROM 113.

The processing to be executed in step S15 is determined in accordance with the setting screen that has been displayed in step S03 or step S25. More specifically, when the setting screen is a copy condition setting screen for setting processing conditions for copy processing, the copy processing is executed. When the setting screen is a scan condition setting screen for setting processing conditions for scan processing, the scan processing is executed. When the setting screen is a print condition setting screen for setting processing conditions for print processing, the print processing is executed. When the setting screen is a facsimile transmit condition setting screen for setting processing conditions for facsimile transmission processing, the facsimile transmission processing is executed.

On the other hand, in step S23, CPU 111 determines whether a setting screen has been selected, similarly as in step S01. If a setting screen has been selected, the process proceeds to step S24; otherwise, the process proceeds to step S14. The processing in steps S24 to S26 is identical to that in steps S02 to S04, and thus, the description thereof will not be repeated. When a first; setting item is set as the process target in step S26, the process returns to step S05. The processing in step S05 and on is then performed, with the setting screen newly displayed in step S25 being set as a process target.

As described above, MFP 100 according to the present embodiment displays a setting screen for setting a setting value for each of a plurality of setting items that determine processing conditions for executing copy, scan, print, or facsimile transmission processing. When one of the plurality of setting items included in the setting screen is designated, MFP 100 displays an input screen including a plurality of input key images. When a hard key is designated, MFP 100 terminates the display of the input screen. In the case where a user wishes to use hard keys to perform an inputting operation, when the user starts to input a setting value using a hard key, the display of the input screen is ceased. Accordingly, while the user is inputting the setting value using the hard keys, the user can see the part of the setting screen that had been hidden under the input screen. Furthermore, the display of the input screen is ceased when the user only inputs a setting value using a hard key. The user does not have to perform an operation of causing the input screen, which is being displayed, to be no longer displayed. This facilitates the user's operation of inputting the setting value.

In the state where the setting screen is being displayed, after a setting value is input using the hard keys, the display of the input screen is inhibited until another setting screen is displayed. Therefore, in the case where a user is about to input setting values in the setting areas for a plurality of setting items included in one setting screen, the input screen is kept from being displayed, allowing the user to input the setting values in the plurality of setting areas using the hard keys continuously. For example, the setting items "horizontal shift" and "vertical shift" shown in FIG. 5 have the common unit in length. Therefore, after a user has used the hard keys to input a setting value for one of these setting items, when the user selects the other setting item, the user can continuously use the hard keys to input a setting value for the other setting item, with no input screen being displayed. Furthermore, in the case where the input screen overlaps any of the setting items and the areas related to the setting items included in the setting screen, the display of the input screen is terminated. This allows the input screen to be displayed only if the input screen will not obstruct the user's operation of inputting the setting value.

Still further, the display of the input screen is terminated on the condition that stylus pen 35 is stored in stylus storage portion 33. Therefore, while the user is using stylus pen 35, the user can input a setting value through the input screen.

<Modification>

According to MFP 100 of the first embodiment described above, when one of a plurality of hard keys included in hard key portion 31 is depressed, or in the case where keyboard 112A is connected to communication I/F portion 112, when a key on the keyboard is depressed, the display of the input screen is terminated or inhibited. According to MFP 100 of a modification of the first embodiment, the display of the input screen is terminated or inhibited in the case where operation panel 20 is located in the first position.

Figure 10:
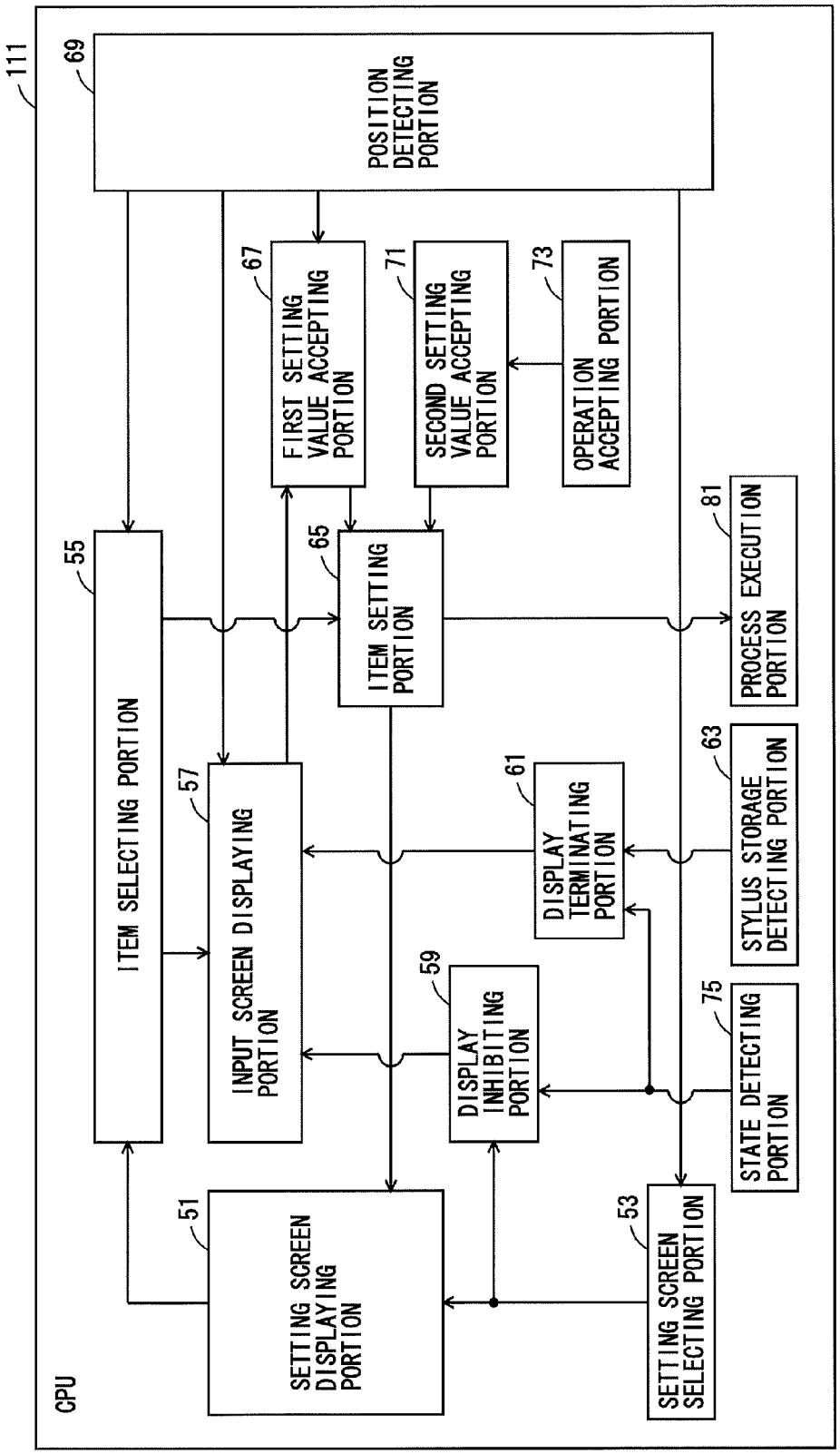
FIG. 10 is a block diagram showing, by way of example, the functions of a CPU included in the MFP according to a modification of the first embodiment.

FIG. 10 is a block diagram showing, by way of example, the functions of a CPU included in the MFP according to the modification of the first embodiment. The functions shown in FIG. 10 differ from the functions shown in FIG. 4 in that a state detecting portion 75 has been added. The other functions in FIG. 10 are identical to those in FIG. 4, and thus, the differences will primarily be described below.

State detecting portion 75 is connected to state detecting sensor 120, and detects the position of operation panel 20. While state detecting sensor 120 is outputting a signal indicating that operation panel 20 is located in the first position, state detecting portion 75 outputs an enable signal to display inhibiting portion 59 and display terminating portion 61. Accordingly, second setting value accepting portion 71 in the modification does not need to output an enable signal to display inhibiting portion 59 or display terminating portion 61.

Display terminating portion 61 receives either a stylus storage signal or a stylus in-use signal from stylus storage detecting portion 63, and receives an enable signal from state detecting portion 75. When an enable signal is input from state detecting portion 75, display terminating portion 61 outputs a terminate signal to input screen displaying portion 57. During the time when the stylus in-use signals are being input from stylus storage detecting portion 63, however, display terminating portion 61 refrains from outputting the terminate signal to input screen displaying portion 57 even if the enable signal is input from state detecting portion 75. In other words, display terminating portion 61 outputs the terminate signal to input screen displaying portion 57 in response to reception of the enable signal from state detecting portion 75 during the time when the stylus storage signals are being input from stylus storage detecting portion 63. While the stylus in-use signals are being input from stylus storage detecting portion 63, stylus pen 35 has been taken out of stylus storage portion 33 and is being used by a user. In this state, there is a possibility that the user may use stylus pen 35 to designate an input key image included in the input screen.

Further, when display terminating portion 61 receives an enable signal from state detecting portion 75, display terminating portion 61 outputs a terminate signal to input screen displaying portion 57 on the condition that the input screen overlaps the setting item or an area related to the setting item included in the setting screen. In other words, even if the enable signal is input from state detecting portion 75, if the input screen does not overlap the setting item or the area related to the setting item included in the setting screen, display terminating portion 61 outputs no terminate signal to input screen displaying portion 57. The area related to the setting item is, for example, an item name thereof. In the case where the setting screen includes more than one setting item, display terminating portion 61 outputs the terminate signal in the case where the input screen overlaps any one of the plurality of setting items and the areas related thereto.

Display inhibiting portion 59 receives setting screen identification information from setting screen selecting portion 53, and receives an enable signal from state detecting portion 75. After the setting screen identification information is input from setting screen selecting portion 53, when the enable signal is input from state detecting portion 75, display inhibiting portion 59 outputs inhibit signals to input screen displaying portion 57 until another piece of setting screen identification information is input from setting screen selecting portion 53.

MFP 100 according to the modification displays a setting screen for setting a setting value for each of a plurality of setting items that determine processing conditions for executing copy, scan, print, or facsimile transmission processing. When one of the plurality of setting items included in the setting screen is designated, MFP 100 displays an input screen including a plurality of input key images. When hard key portion 31 included in operation panel 20 is positioned in the first position where the user is able to press the hard keys, MFP 100 terminates the display of the input screen. Accordingly, when the user wishes to perform an inputting operation using the hard keys, the input screen is kept from being displayed. This allows the user to see the part of the setting screen that had been hidden under the input screen.

<Second Embodiment>

Figure 11:
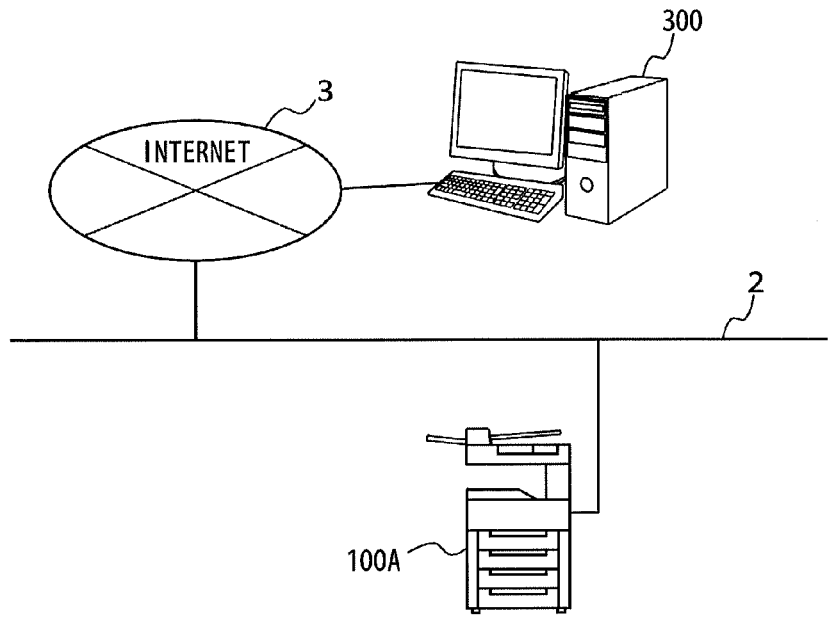
FIG. 11 schematically shows an image forming system according to a second embodiment of the present invention.

FIG. 11 schematically shows an image forming system according to a second embodiment of the present invention. Referring to FIG. 11, an image forming system 1 according to the second embodiment includes an MFP 100A and a personal computer (PC) 300. MFP 100A and PC 300 are connected to each other via a LAN 2 and the Internet 3, so that they can communicate with each other. While it is assumed in the present embodiment that MFP 100A is connected to PC 300 via LAN 2 and the Internet 3, they may be connected via LAN 2, or connected via the Internet 3, or directly connected via a serial communication cable or the like. Furthermore, MFP 100A and PC 300 do not have to be connected in a wired manner; they may be connected in a wireless manner.

The external feature and the hardware configuration of MFP 100A of the second embodiment are identical to those of MFP 100 according to the first embodiment. Thus, the description thereof will not be repeated. An application program interface (API) has been released, and MFP 100A is able to install an application program that uses the API. Here, an application program for executing processing in cooperation with PC 300 has been installed in MFP 100A.

The application program installed in MFP 100A displays on LCD 25 a screen that is received from PC 300, and transmits to PC 300 the coordinates of the position detected by touch panel 29 as well as the key identification information of the hard key depressed by the user from among the plurality of hard keys included in hard key portion 31. In other words, the application program causes operation panel 20 included in MFP 100A to serve as a user interface for the user who operates MFP 100A to operate PC 300. The application program of this type is well known in the art, and thus, a detailed description thereof will not be provided here.

PC 300 is a typical computer. PC 300 has a setting program for controlling MFP 100A installed therein. The setting program has been coded using the API that has been released for MFP 100A.

Figure 12:
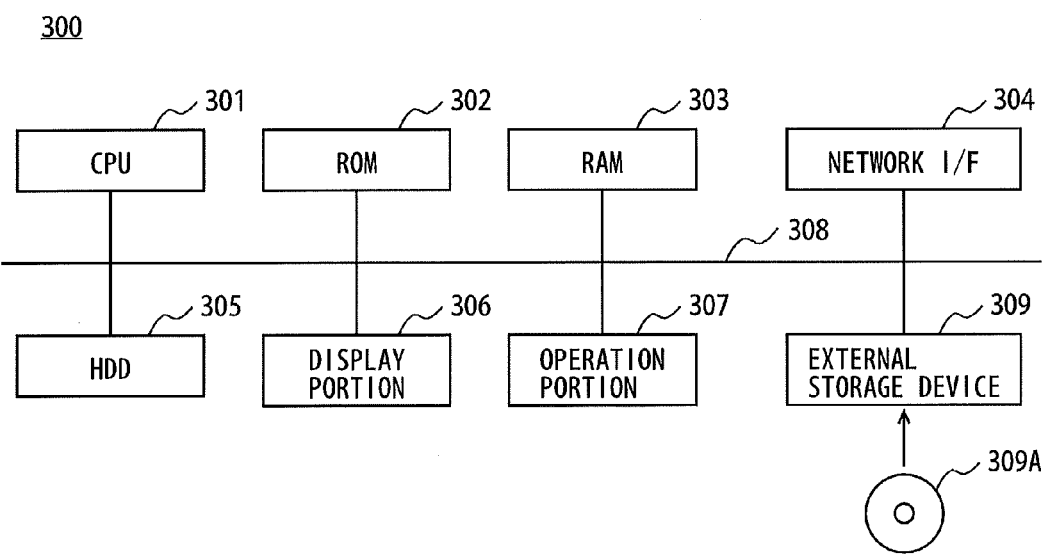
FIG. 12 is a block diagram showing, by way of example, the hardware configuration of a PC included in the image forming system of the second embodiment.

FIG. 12 is a block diagram showing, by way of example, the hardware configuration of PC 300. Referring to FIG. 12, PC 300 includes: a CPU 301 which is responsible for overall control of PC 300; a ROM 302 which stores, for example, a program to be executed by CPU 301; a RAM 303 used as a work area of CPU 301; a network I/F 304 for connecting PC 300 to a network; a HDD 305 as a mass storage; a display portion 306; an operation portion 307 which accepts an input according to an operation by a user; and an external storage device 309. These components are each connected to a bus 308.

External storage device 309 is mounted with a CD-ROM 309A which stores a program therein. CPU 301 loads the program stored in CD-ROM 309A, via external storage device 309, into RAM 303 for execution. It is noted that the recording medium for storing the program is not restricted to CD-ROM 309A. It may be a flexible disk, a cassette tape, an optical disk (MO, MD, DVD), an IC card, an optical card, or a semiconductor memory such as a mask ROM, an EPROM, an EEPROM, or the like. Further, CPU 301 may load a program stored in HDD 305 into RAM 303 for execution. In this case, PC 300 may download a program from another computer connected to LAN 2 to store the program into HDD 305. As used herein, the "program" includes, not only the program which CPU 301 can execute directly, but also a source program, a compressed program, an encrypted program, and others.

Figure 13:
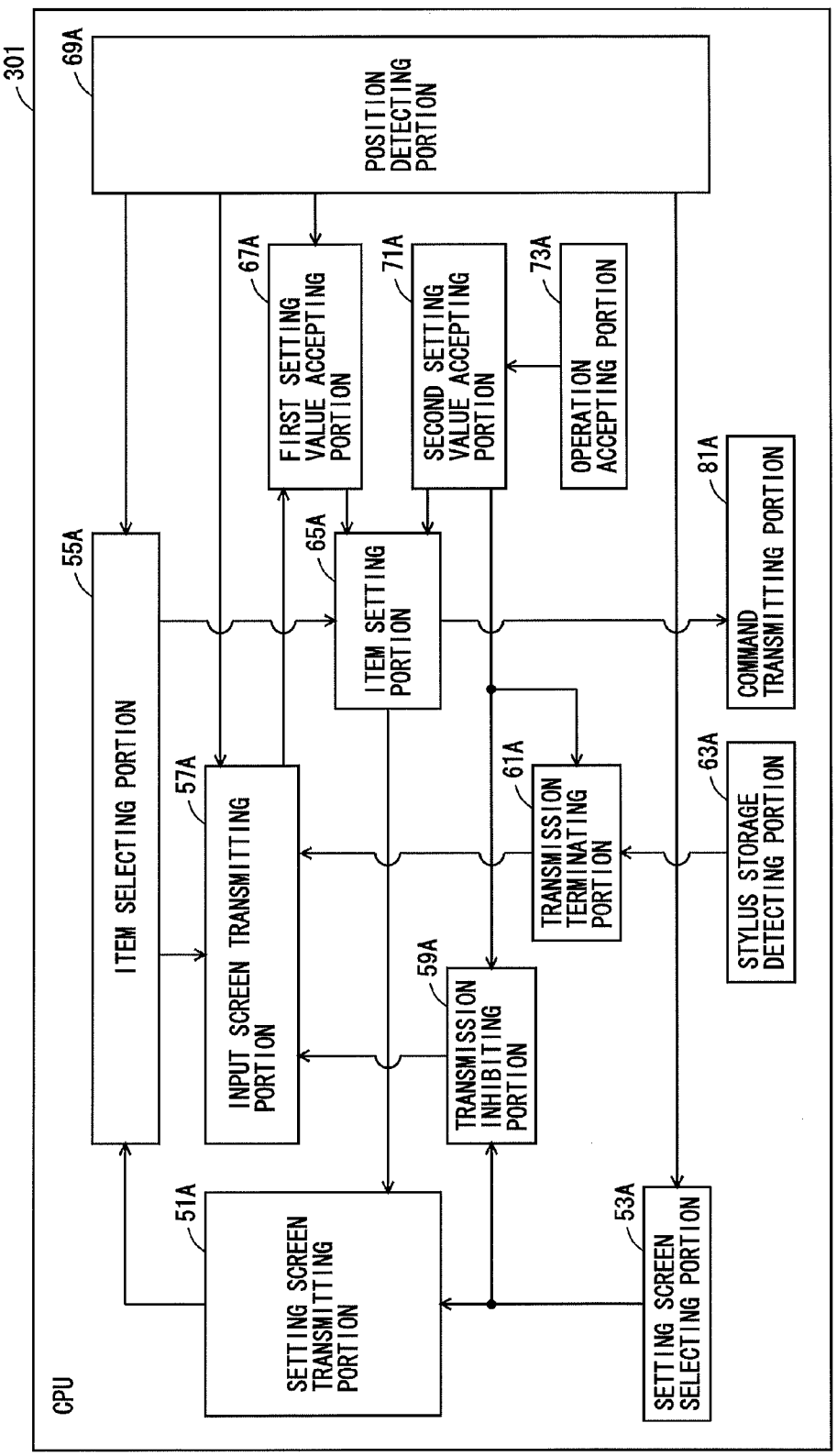
FIG. 13 is a block diagram showing, by way of example, the functions of a CPU included in the PC of the second embodiment.

FIG. 13 is a block diagram showing, by way of example, the functions of a CPU included in the PC according to the second embodiment. The functions shown in FIG. 13 are formed in CPU 301 included in PC 300 as CPU 301 executes a setting program stored in ROM 302, HDD 305, or CD-ROM 309A. Referring to FIG. 13, CPU 301 included in PC 300 includes: a setting screen selecting portion 53A which selects a setting screen; a setting screen transmitting portion 51A which transmits a setting screen to MFP 100A; an item selecting portion 55A which selects a setting item; an input screen transmitting portion 57A which transmits an input screen to MFP 100A; a transmission inhibiting portion 59A which inhibits the transmission of an input screen; a transmission terminating portion 61A which terminates the transmission of an input screen; a stylus storage detecting portion 63A; an item setting portion 65A which sets a setting value for a setting item; a first setting value accepting portion 67A; a position detecting portion 69A which detects a position designated on the display surface of LCD 25 included in MFP 100A; an operation accepting portion 73A which accepts an operation input into hard key portion 31 included in MFP 100A; a second setting value accepting portion 71A: and a command transmitting portion 81A which transmits a command to cause MFP 100A to execute processing.

Command transmitting portion 81A transmits, via network I/F 304 to MFP 100A, a command to cause MFP 100A to execute processing in accordance with the processing conditions set by item setting portion 65A. The processing that MFP 100A executes as it receives a command from command transmitting portion 81A includes, for example, scan processing, copy processing, print processing, and facsimile transmission/reception processing.

As MFP 100A transmits the coordinates of the position detected by touch panel 29, position detecting portion 69A controls network I/F 304 to acquire the coordinates of the position transmitted from MFP 100A. Position detecting portion 69A outputs the coordinates of the detected position to item selecting portion 55A, input screen transmitting portion 57A, first setting value accepting portion 67A, and setting screen selecting portion 53A.

Setting screen selecting portion 53A selects one of a plurality of setting screens stored in advance in HDD 305, and outputs the setting screen identification information for identifying the selected setting screen to setting screen transmitting portion 51A and transmission inhibiting portion 59A.

The plurality of setting screens correspond respectively to the commands transmitted by command transmitting portion 81A. For example, the setting screens include a setting screen corresponding to the command to cause MFP 100A to perform scan processing, a setting screen corresponding to the command to cause MFP 100A to perform copy processing, a setting screen corresponding to the command to cause MFP 100A to perform print processing, and a setting screen corresponding to the command to cause MFP 100A to perform facsimile transmission/reception processing. The setting screen is a screen for setting a setting value for each of a plurality of setting items that determine processing conditions for MFP 100A to perform processing. The setting screen has an area for displaying an item name and a setting value for each of the plurality of setting items. Further, the plurality of setting screens include a setting screen provided with a transition function. The setting screen with the transition function has at least one transition button allowing a user to select another setting screen.

For example, setting screen selecting portion 53A transmits a menu screen that includes a plurality of pieces of setting screen identification information for identifying the respective setting screens, to MFP 100A. MFP 100A displays the menu screen on LCD 25, and when a user operates touch panel 29 to designate one of the plurality of pieces of setting screen identification information displayed on the menu screen, MFP 100A transmits back the coordinates of the designated position. Setting screen selecting portion 53A specifies the setting screen identification information that the user operating MFP 100A has designated from among the plurality of pieces of setting screen identification information displayed on the menu screen, on the basis of the coordinates of the position detected in position detecting portion 69A, and selects the setting screen that corresponds to the specified setting screen identification information. In the case where a setting screen with the transition function has been transmitted to MFP 100A, when a user operates touch panel 29 to designate a transition button included in the setting screen with the transition function, MFP 100A transmits back the coordinates of the designated position. Setting screen selecting portion 53A specifies the transition button designated by the user, on the basis of the coordinates of the position detected in position detecting portion 69A, and selects the setting screen that is associated with the specified transition button.

When setting screen transmitting portion 51A receives setting screen identification information from setting screen selecting portion 53A, setting screen transmitting portion 51A reads from HDD 305 the setting screen specified by the setting screen identification information, and outputs the read setting screen to input screen transmitting portion 57A, and also transmits the same to MFP 100A.

Item selecting portion 55A selects, as a process target, one of the plurality of setting items included in the setting screen that has been selected by a user who operates MFP 100A. Specifically, when a user designates one of the images of the plurality of item names displayed on LCD 25 with his/her finger, touch panel 29 detects the position designated by the user. MFP 100A then transmits back the coordinates of the designated position. item selecting portion 55A specifies which one of the images of the item names has been designated by the user of MFP 100A, on the basis of the coordinates of the position detected in position detecting portion 69A, and selects the setting item that corresponds to the specified item name image. Item selecting portion 55A outputs the item name of the setting item, selected from among the plurality of setting items, to input screen transmitting portion 57A and item setting portion 65A.

When input screen transmitting portion 57A receives an item name from item selecting portion 55A, input screen transmitting portion 57A transmits to MFP 100A a setting screen overlaid with an input screen in which the input screen corresponding to the input item name is overlaid on the setting screen that had been transmitted by setting screen transmitting portion 51A. For each item name, an attribute of a setting value which is set for a setting item specified by the item name is predetermined, and the input screen includes a plurality of input key images corresponding to the attribute. The attribute includes text or numeric, and in the case of the text, its type (i.e. kana characters or alphabet letters).

First setting value accepting portion 67A accepts a setting value on the basis of one of the input key images, included in the input screen, that has been designated by a user who operates MFP 100A. When a user designates, with his/her finger, any of the plurality of input key images displayed on LCD 25, touch panel 29 detects the position designated by the user, and MFP 100A transmits back the coordinates of the designated position. First setting value accepting portion 67A specifies which one of the input key images has been designated by the user of MFP 100A, on the basis of the coordinates of the position detected in position detecting portion 69A, and accepts the value corresponding to the specified input key image. First setting value accepting portion 67A outputs the accepted value, as a setting value, to item setting portion 65A.

In the case where a user of MFP 100A designates two or more input key images successively, first setting value accepting portion 67A arranges the values corresponding respectively to the designated input key images in the accepted order thereof to obtain a value, and outputs the obtained value as the setting value to item setting portion 65A.

When a user presses one of the plurality of hard keys included in hard key portion 31 in MFP 100A, MFP 100A transmits the key identification information of the depressed hard key to PC 300. In the case where keyboard 112A is connected to communication I/F portion 112, when a user operates the keyboard, MFP 100A accepts the key identification information of the key depressed by the user from communication I/F portion 112, and transmits the accepted key identification information to PC 300. When network I/F 304 receives the key identification information from MFP 100A, operation accepting portion 73A accepts the received key identification information. Operation accepting portion 73A then outputs the accepted key identification information to second setting value accepting portion 71A.

Second setting value accepting portion 71A accepts a value that corresponds to the key identification information input from operation accepting portion 73A as a setting value. Second setting value accepting portion 71A outputs the accepted value as the setting value to item setting portion 65A. Further, when receiving the key identification information from operation accepting portion 73A, second setting value accepting portion 71A outputs an enable signal to transmission inhibiting portion 59A and transmission terminating portion 61A.

Stylus storage sensor 119 included in MFP 100A outputs ON signals while stylus pen 35 is present in stylus storage portion 33, whereas it outputs OFF signals while stylus pen 35 is not in stylus storage portion 33. When the signal output from stylus storage sensor 119 changes, MFP 100A transmits the changed state of stylus pen 35 to PC 300. Stylus storage detecting portion 63A receives the state of stylus pen 35 from MFP 100A. When stylus pen 35 is in the stored state, stylus storage detecting portion 63A outputs a stylus storage signal to transmission terminating portion 61A. When stylus pen 35 is in use, stylus storage detecting portion 63A outputs a stylus in-use signal to transmission terminating portion 61A.

Transmission terminating portion 61A receives either a stylus storage signal or a stylus in-use signal from stylus storage detecting portion 63A, and receives an enable signal from second setting value accepting portion 71A. When an enable signal is input from second setting value accepting portion 71A, transmission terminating portion 61A outputs a terminate signal to input screen transmitting portion 57A. During the time when the stylus in-use signals are being input from stylus storage detecting portion 63A, however, transmission terminating portion 61A refrains from outputting the terminate signal to input screen transmitting portion 57A even if the enable signal is input from second setting value accepting portion 71A. In other words, transmission terminating portion 61A outputs the terminate signal to input screen transmitting portion 57A in response to reception of the enable signal from second setting value accepting portion 71A during the time when the stylus storage signals are being input from stylus storage detecting portion 63A. While the stylus in-use signals are being input from stylus storage detecting portion 63A, stylus pen 35 has been taken out of stylus storage portion 33 and is being used by a user of MFP 100A. In this state, there is a possibility that the user may use stylus pen 35 to designate an input key image included in the input screen.

Further, when transmission terminating portion 61A receives an enable signal from second setting value accepting portion 71A, transmission terminating portion 61A outputs a terminate signal to input screen transmitting portion 57A on the condition that the input screen overlaps the setting item or an area related to the setting item included in the setting screen.

Transmission inhibiting portion 59A receives setting screen identification information from setting screen selecting portion 53A, and receives an enable signal from second setting value accepting portion 71A. After the setting screen identification information is input from setting screen selecting portion 53A, when the enable signal is input from second setting value accepting portion 71A, transmission inhibiting portion 59A outputs inhibit signals to input screen transmitting portion 57A until another piece of setting screen identification information is input from setting screen selecting portion 53A.

When input screen transmitting portion 57A receives a terminate signal from transmission terminating portion 61A after it had transmitted a setting screen overlaid with an input screen to MFP 100A, input screen transmitting portion 57A outputs a transmission instruction to setting screen transmitting portion 51A. When receiving the transmission instruction, setting screen transmitting portion 51A retransmits a setting screen to MFP 100A. MFP 100A in turn displays the received setting screen on LCD 25, so that the input screen that had been displayed to then is erased. As such, once the user who is operating MFP 100A has selected an operation of inputting a setting value using either hard key portion 31 or keyboard 112A, the display of the input screen is ceased. This allows the user to input the setting value while viewing the entire setting screen.

Further, as long as the inhibit signals are being input from transmission inhibiting portion 59A, even if an item name is input from item selecting portion 55A, input screen transmitting portion 57A refrains from transmitting to MFP 100A a setting screen overlaid with the input screen corresponding to the input item name. In other words, in response to reception of an item name from item selecting portion 55A, input screen transmitting portion 57A transmits to MFP 100A the setting screen overlaid with the input screen corresponding to the input item name, on the condition that no inhibit signal is input from transmission inhibiting portion 59A. In the case where the setting screen transmitted to MFP 100A includes two or more setting items, when a user has selected one of the plurality of setting items, input screen transmitting portion 57A transmits to MFP 100A a setting screen overlaid with an input screen. However, if the user wishes to input a setting value for one setting item using the hard keys included in hard key portion 31 or keyboard 112A connected to communication I/F portion 112, it is highly likely that the user will wish to input a setting value for another setting item using hard key portion 31 or keyboard 112A as well, rather than using the input screen. In the setting screen overlaid with the input screen, a part of the setting screen is hidden under the input screen, which is undesirable. Therefore, after the user operating MFP 100A has selected an operation of inputting a setting value using hard key portion 31 or keyboard 112A on one setting screen, the setting screen overlaid with the input screen is kept from being transmitted, to allow the user to continue the operations using hard key portion 31 or keyboard 112A. This may facilitate the user operations.

Item setting portion 65A receives an item name of a setting item from item selecting portion 55A, and receives a setting value from first setting value accepting portion 67A or second setting value accepting portion 71A. When receiving a setting value from first setting value accepting portion 67A or second setting value accepting portion 71A, item setting portion 65A temporarily stores in RAM 303 a set of the setting value and the item name of the setting item that has been received from item selecting portion 55A prior to the reception of the setting value. Whenever receiving a setting value from first setting value accepting portion 67A or second setting value accepting portion 71A, item setting portion 65A temporarily stores a set of the setting value and the item name of the setting item into RAM 303, until a setting instruction is received from MFP 100A. This means that two or more sets may be temporarily stored in RAM 303. The setting instruction is input to MFP 100A by a user who operates MFP 100A as the user presses a predetermined hard key included in hard key portion 31, and the key identification information of the depressed hard key is transmitted from MFP 100A to PC 300. Item setting portion 65A detects the setting instruction as the key identification information of the predetermined hard key is received from MFP 100A.

Meanwhile, HDD 305 stores, for each piece of setting screen identification information, default setting values predetermined respectively for a plurality of setting items. Before a setting instruction is detected, item setting portion 65A reads the default setting values for the respective setting items that are stored in HDD 305 in correspondence with the setting screen identification information received from setting screen selecting portion 53A, and stores a plurality of sets of the default setting values and the item names of the corresponding setting items, as processing conditions, into RAM 303. When a setting instruction is detected, item setting portion 65A outputs the set of the setting value and the item name of the setting item temporarily stored in RAM 303 to setting screen transmitting portion 51A, and further, updates the processing conditions on the basis of the set of the setting value and the item name of the setting item temporarily stored in RAM 303.

Whenever a setting instruction is detected, item setting portion 65A updates the setting value that has been stored in RAM 303 as the processing condition with the setting value that has been input from first setting value accepting portion 67A or second setting value accepting portion 71A and temporarily stored in RAM 303, until an execution instruction is input by the user. Every time the setting instruction is detected, item setting portion 65A updates the processing condition, and further outputs the set of the setting value and the item name of the setting item temporarily stored in RAM 303, to setting screen transmitting portion 51A.

The execution instruction is input to MFP 100A by a user who operates MFP 100A as the user presses start key 31A included in hard key portion 31, and the key identification information of the depressed start key 31A is transmitted from MFP 100A to PC 300. Item setting portion 65A detects the execution instruction as the key identification information of start key 31A is received from MFP 100A.

Whenever the set of the setting value and the item name of the setting item is input from item setting portion 65A, setting screen transmitting portion 51A transmits the setting screen having the updated setting value to MFP 100A. More specifically, setting screen transmitting portion 51A recomposes a setting screen by arranging the image of the setting value received from item setting portion 65A in the area for displaying the setting value corresponding to the setting item on the setting screen, and transmits the recomposed setting screen to MFP 100A. The setting screen with the updated setting value is displayed on LCD 25 in MFP 100A, and therefore, the setting value that the user has input as the setting value is displayed on the setting screen. This allows the user to confirm the setting value by checking the setting screen. In the case where the setting screen overlaid with the input screen has been transmitted, a setting screen overlaid with an input screen, having the input screen overlaid on the setting screen with the updated setting value, is transmitted to MFP 100A.

When item setting portion 65A detects the execution instruction by the user, item setting portion 65A outputs a command transmission instruction to command transmitting portion 81A. The command transmission instruction includes the sets of the setting values and the setting items that are stored as the processing conditions in RAM 303. When receiving a command transmission instruction from item setting portion 65A, command transmitting portion 81A transmits, via network I/F 304 to MFP 100A, a command to execute processing in accordance with the processing conditions included in the command transmission instruction.

In CPU 301 included in PC 300 according to the second embodiment, a process similar to the setting process shown in FIG. 9 is carried out, except for the following points. In steps S03 and S25 in each of which a setting screen is to be displayed, the setting screen is transmitted to MFP 100A. In step S08 in which an input screen is to be displayed, the setting screen overlaid with the input screen is transmitted to MFP 100A. Further, in steps S01, S05, S10, S11, S14, S16, S17, S22, and S23 in each of which an operation input to MFP 100A by a user who is operating MFP 100A is to be accepted, an operation input into MFP 100A is transmitted to PC 300. Thus, the content of operation is received from MFP 100A to thereby accept the user's operation.

<Modification>

A modification of the second embodiment will now be described. According to image forming system 1 of the second embodiment described above, when one of a plurality of hard keys included in hard key portion 31 is depressed on the MFP 100A side, or in the case where keyboard 112A is connected to communication I/F portion 112, when a key on the keyboard is depressed on the MFP 100A side, transmission of a setting screen overlaid with an input screen is terminated or inhibited on the PC 300 side. According to image forming system 1 of the modification of the second embodiment, the transmission of the setting screen overlaid with the input screen from PC 300 is terminated or inhibited in the case where operation panel 20 included in MFP 100A is in the first position.

Figure 14:
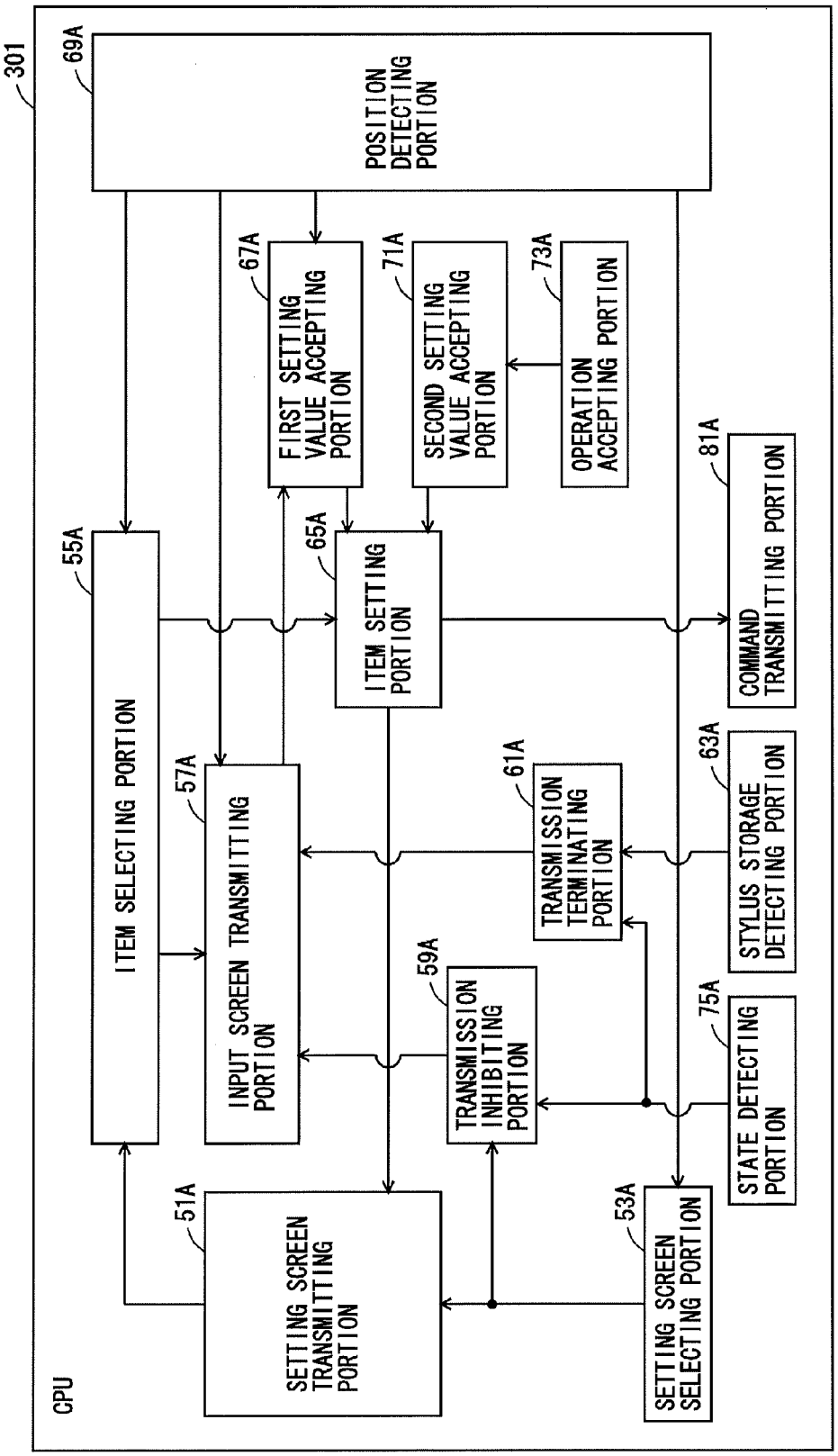
FIG. 14 is a block diagram showing, by way of example, the functions of a CPU included in the PC according to a modification of the second embodiment.

FIG. 14 is a block diagram showing, by way of example, the functions of a CPU included in the PC according to the modification of the second embodiment. The functions shown in FIG. 14 differ from the functions shown in FIG. 13 in that a state detecting portion 75A has been added. The other functions are identical, and thus, the differences will primarily be described below.

State detecting sensor 120 included in MFP 100A detects the position of operation panel 20. Specifically, state detecting sensor 120 detects whether operation panel 20 is in the first position or the second position, and outputs the detected position of operation panel 20 to CPU 111. When the position of operation panel 20 has changed, MFP 100A transmits the changed position of the operation panel to PC 300. State detecting portion 75A receives the position of operation panel 20 from MFP 100A, and when operation panel 20 is in the first position, state detecting portion 75A outputs an enable signal to transmission inhibiting portion 59A and transmission terminating portion 61A. Accordingly, second setting value accepting portion 71A in the modification of the second embodiment does not need to output an enable signal to transmission inhibiting portion 59A or transmission terminating portion 61A.

PC 300 according to the modification of the second embodiment causes MFP 100A to display a setting screen for setting a setting value for each of a plurality of setting items that determine processing conditions for executing copy, scan, print, or facsimile transmission processing. Then, in response to designation of one of the plurality of setting items included in the setting screen, PC 300 causes MFP 100A to display a setting screen overlaid with an input screen including a plurality of input key images. When operation panel 20 is located in a first position where a user is able to press hard keys, PC 300 transmits to MFP 100A the setting screen, instead of the setting screen overlaid with the input screen, to thereby terminate the display of the setting screen overlaid with the input screen. Accordingly, when the user wishes to perform an inputting operation using the hard keys, the input screen is no longer displayed. This allows the user to see the part of the setting screen that was hidden under the input screen when the input screen was overlaid on the setting screen.

While MFP 100 as the image forming apparatus and image forming system 1 have been described in the above embodiments, the present invention may of course be identified as a setting method for causing MFP 100 or PC 300 to perform the setting process shown in FIG. 9, or as a setting program for causing CPU 111 included in MFP 100 or CPU 301 included in PC 300 to perform the setting method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
a setting screen displaying portion to display a setting screen having a setting area for setting a setting value therein;
an input screen displaying portion, operable in response to designation by a user of a position within a prescribed area that is determined by said setting area in said setting screen when said setting screen is being displayed, to display an input screen so as to be overlaid on said setting screen being displayed, the input screen being a screen different from said setting screen and including a plurality of input key images;
a first setting value accepting portion to accept a value corresponding to one of the input key images that is designated by the user from among said plurality of input key images included in said input screen;
an operation accepting portion including a plurality of hard keys;
a second setting value accepting portion to accept a value corresponding to the hard key designated by the user from among said plurality of hard keys; and
a display terminating portion, operable in response to acceptance of an operation of enabling said operation accepting portion when said input screen is being displayed by said input screen displaying portion, to terminate the display of said input screen by said input screen displaying portion;
wherein said operation accepting portion is movable between a first position where said plurality of hard keys can be designated and a second position where said plurality of hard keys cannot be designated, and the operation of enabling said operation accepting portion is an operation of moving said operation accepting portion to said first position.

2. The image forming apparatus according to claim 1, wherein there are a plurality of said setting screens,
the image forming apparatus further comprising a display inhibiting portion to inhibit the display of said input screen by said input screen displaying portion from when the operation of enabling said operation accepting portion is accepted when a first setting screen among said plurality of setting screens is being displayed by said setting screen displaying portion until when a second setting screen that is among said plurality of setting screens and different from said first setting screen is displayed by said setting screen displaying portion.

3. The image forming apparatus according to claim 1, wherein said display terminating portion terminates the display of said input screen when said input screen overlaps one of said setting area and an area related to the setting area included in said setting screen.

4. The image forming apparatus according to claim 1, further comprising:
a storage portion to store a designation device for designating said input key image; and
a storage detecting portion to detect that said designation device is stored in said storage portion; wherein
said display terminating portion terminates the display of said input screen on the condition that said storage detecting portion detects that said designation device is stored in said storage portion.

5. An image forming apparatus comprising:
a setting screen displaying portion to display a setting screen having a setting area for setting a setting value therein;
an input screen displaying portion, operable in response to designation by a user of a position within a prescribed area that is determined by said setting area in said setting screen when said setting screen is being displayed, to display an input screen so as to be overlaid on said setting screen being displayed, the input screen being a screen different from said setting screen and including a plurality of input key images;
a first setting value accepting portion to accept a value corresponding to one of the input key images that is designated by the user from among said plurality of input key images included in said input screen;
an operation accepting portion including a plurality of hard keys;
a second setting value accepting portion to accept a value corresponding to the hard key designated by the user from among said plurality of hard keys; and
a display terminating portion, operable in response to acceptance of an operation of enabling said operation accepting portion when said input screen is being displayed by said input screen displaying portion, to terminate the display of said input screen by said input screen displaying portion;
wherein the operation of enabling said operation accepting portion is an operation of designating one of said plurality of hard keys.

6. An image forming system including a computer and an image forming apparatus capable of communicating with said computer,
the image forming apparatus comprising:
a display portion to display an image of data received from said computer;
a position detecting portion provided on a display surface of said display portion and configured to detect a position designated by a user;
a position transmitting portion to transmit the position detected by said position detecting portion to said computer;
an operation accepting portion to accept an operation of designating one of a plurality of input keys provided separately from said position detecting portion; and
an instruction transmitting portion, operable in response to acceptance of the operation of designating one of said plurality of input keys by said operation accepting portion, to transmit an instruction accepting signal to said computer, the instruction accepting signal including a value corresponding to the one of said plurality of input keys that is specified by said accepted operation;
the computer comprising:
a setting screen transmitting portion to transmit data of a setting screen to said image forming apparatus, the setting screen having an area for setting a setting value therein;
an input screen transmitting portion, operable in response to reception of a position within a prescribed area in said setting screen from said image forming apparatus when said setting screen is being displayed by said image forming apparatus, to transmit data of a setting screen overlaid with an input screen to said image forming apparatus, the setting screen overlaid with the input screen being a screen in which the input screen that is different from said setting screen and that includes a plurality of input key images is overlaid on said setting screen;

a first setting value accepting portion, operable in response to reception of a position within said plurality of input key images included in said input screen from said image forming apparatus, to accept a value corresponding to the input key image that is at said received position;

a second setting value accepting portion, operable in response to reception of the instruction accepting signal from said image forming apparatus, to accept the value that is included in said received instruction accepting signal; and a transmission terminating portion, operable in response to reception of said instruction accepting signal from said image forming apparatus after said setting screen overlaid with the input screen had been transmitted by said input screen transmitting portion to said image forming apparatus, to terminate the transmission of the data of said setting screen overlaid with the input screen by said input screen transmitting portion.

7. A setting method performed by an image forming apparatus, the image forming apparatus including an operation accepting portion having a plurality of hard keys, the method comprising:

a setting screen displaying step of displaying a setting screen having a setting area for setting a setting value therein;

an input screen displaying step of, in response to designation by a user of a position within a prescribed area that is determined by said setting area in said setting screen when said setting screen is being displayed, displaying an input screen so as to be overlaid on said setting screen being displayed, the input screen being a screen different from said setting screen and including a plurality of input key images;

a first setting step of accepting a value corresponding to one of the input key images that is designated by the user from among said plurality of input key images included in said input screen;

a second setting step of accepting a value corresponding to the hard key designated by the user from among said plurality of hard keys; and a display terminating step of, in response to acceptance of an operation of enabling said operation accepting portion when said input screen is being displayed in said input screen displaying step, terminating the display of said input screen in said input screen displaying step;

wherein said operation accepting portion is movable between a first position where said plurality of hard keys can be designated and a second position where said plurality of hard keys cannot be designated, and the operation of enabling said operation accepting portion is an operation of moving said operation accepting portion to said first position.

8. The setting method according to claim 7, wherein there are a plurality of said setting screens, the method further comprising a display inhibiting step of inhibiting the display of said input screen in said input screen displaying step from when the operation of enabling said operation accepting portion is accepted when a first setting screen among said plurality of setting screens is being displayed in said setting screen displaying step until when a second setting screen that is among said plurality of setting screens and different from said first setting screen is displayed in said setting screen displaying step.

9. The setting method according to claim 7, wherein said display terminating step includes a step of terminating the display of said input screen when said input screen overlaps one of said setting area and an area related to the setting area included in said setting screen.

10. The setting method according to claim 7, wherein said image forming apparatus further includes a storage portion to store a designation device for designating said input key image, the method further comprising a storage detecting step of detecting that said designation device is stored in said storage portion, wherein said display terminating step includes a step of terminating the display of said input screen on the condition that said storage detecting step detects that said designation device is stored in said storage portion.

11. A setting method performed by an image forming apparatus, the image forming apparatus including an operation accepting portion having a plurality of hard keys, the method comprising:

a setting screen displaying step of displaying a setting screen having a setting area for setting a setting value therein;

an input screen displaying step of, in response to designation by a user of a position within a prescribed area that is determined by said setting area in said setting screen when said setting screen is being displayed, displaying an input screen so as to be overlaid on said setting screen being displayed, the input screen being a screen different from said setting screen and including a plurality of input key images;

a first setting step of accepting a value corresponding to one of the input key images that is designated by the user from among said plurality of input key images included in said input screen;

a second setting step of accepting a value corresponding to the hard key designated by the user from among said plurality of hard keys; and a display terminating step of, in response to acceptance of an operation of enabling said operation accepting portion when said input screen is being displayed in said input screen displaying step, terminating the display of said input screen in said input screen displaying step;

wherein the operation of enabling said operation accepting portion is an operation of designating one of said plurality of hard keys.

12. A non-transitory computer-readable recording medium encoded with a setting program performed by a computer which controls an image forming apparatus, the image forming apparatus including an operation accepting portion having a plurality of hard keys, the program causing said computer to execute:

a setting screen displaying step of displaying a setting screen having a setting area for setting a setting value therein;

an input screen displaying step of, in response to designation by a user of a position within a prescribed area that is determined by said setting area in said setting screen when said setting screen is being displayed, displaying an input screen so as to be overlaid on said setting screen being displayed, the input screen being a screen different from said setting screen and including a plurality of input key images;

a first setting step of accepting a value corresponding to one of the input key images that is designated by the user from among said plurality of input key images included in said input screen;

a second setting step of accepting a value corresponding to the hard key designated by the user from among said plurality of hard keys; and a display terminating step of, in response to acceptance of an operation of enabling said operation accepting portion when said input screen is being displayed in said input screen displaying step, terminating the display of said input screen in said input screen displaying step;

wherein said operation accepting portion is movable between a first position where said plurality of hard keys can be designated and a second position where said plurality of hard keys cannot be designated, and the operation of enabling said operation accepting portion is an operation of moving said operation accepting portion to said first position.

13. The non-transitory computer-readable recording medium encoded with the setting program according to claim 12, wherein there are a plurality of said setting screens, the program further causing said computer to execute a display inhibiting step of inhibiting the display of said input screen in said input screen displaying step from when the operation of enabling said operation accepting portion is accepted when a first setting screen among said plurality of setting screens is being displayed in said setting screen displaying step until when a second setting screen that is among said plurality of setting screens and different from said first setting screen is displayed in said setting screen displaying step.

14. The non-transitory computer-readable recording medium encoded with the setting program according to claim 12, wherein said display terminating step includes a step of terminating the display of said input screen when said input screen overlaps one of said setting area and an area related to the setting area included in said setting screen.

15. The non-transitory computer-readable recording medium encoded with the setting program according to claim 12, wherein said image forming apparatus further includes a storage portion to store a designation device for designating said input key image, the program further causing said computer to execute a storage detecting step of detecting that said designation device is stored in said storage portion, wherein said display terminating step includes a step of terminating the display of said input screen on the condition that said storage detecting step detects that said designation device is stored in said storage portion.

16. A non-transitory computer-readable recording medium encoded with a setting program performed by a computer which controls an image forming apparatus, the image forming apparatus including an operation accepting portion having a plurality of hard keys, the program causing said computer to execute:

a setting screen displaying step of displaying a setting screen having a setting area for setting a setting value therein;

an input screen displaying step of, in response to designation by a user of a position within a prescribed area that is determined by said setting area in said setting screen when said setting screen is being displayed, displaying an input screen so as to be overlaid on said setting screen being displayed, the input screen being a screen different from said setting screen and including a plurality of input key images;

a first setting step of accepting a value corresponding to one of the input key images that is designated by the user from among said plurality of input key images included in said input screen:

a second setting step of accepting a value corresponding to the hard key designated by the user from among said plurality of hard keys; and a display terminating step of, in response to acceptance of an operation of enabling said operation accepting portion when said input screen is being displayed in said input screen displaying step, terminating the display of said input screen in said input screen displaying step;

wherein the operation of enabling said operation accepting portion is an operation of designating one of said plurality of hard keys.

* * * * *